(12) United States Patent
Yu et al.

(10) Patent No.: US 12,120,645 B2
(45) Date of Patent: Oct. 15, 2024

(54) CONDITIONAL RECONFIGURATION RELEASE METHOD AND DEVICE USED IN COMMUNICATION NODE FOR WIRELESS COMMUNICATION

(71) Applicants: Qiaoling Yu, Shanghai (CN); Xiaobo Zhang, Shanghai (CN)

(72) Inventors: Qiaoling Yu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 378 days.

(21) Appl. No.: 17/560,299

(22) Filed: Dec. 23, 2021

(65) Prior Publication Data

US 2022/0210771 A1 Jun. 30, 2022

(30) Foreign Application Priority Data

Dec. 31, 2020 (CN) .......................... 202011638559.9

(51) Int. Cl.
H04W 72/04 (2023.01)
(52) U.S. Cl.
CPC .................................. *H04W 72/04* (2013.01)
(58) Field of Classification Search
CPC ........... H04W 72/04; H04W 36/00837; H04W 36/36; H04W 36/0061; H04W 36/08;
(Continued)

(56) References Cited

U.S. PATENT DOCUMENTS

2019/0349938 A1* 11/2019 Chen ...................... H04W 64/00
2022/0191754 A1* 6/2022 Yao .................... H04W 36/0058
(Continued)

FOREIGN PATENT DOCUMENTS

| CN | 110290541 A | 9/2019 |
| CN | 111465072 A | 7/2020 |
| CN | 111866965 A | 10/2020 |

OTHER PUBLICATIONS

WO 2021/016856 A1 (Year: 2021).*
(Continued)

*Primary Examiner* — Rushil P. Sampat

(57) ABSTRACT

The present disclosure discloses a method and a device used in a communication node for wireless communications. A communication node receives multiple pieces of configuration sub-information, of which each piece of configuration sub-information includes one execution condition and one configuration set; in instances when the execution condition in first configuration sub-information is fulfilled, applies the configuration set in the first configuration sub-information, and transmits a first message; in instances when a first condition set is fulfilled after transmitting the first message, maintains a subset of the multiple pieces of configuration sub-information, the subset of the multiple pieces of configuration sub-information at least including second configuration sub-information; the first configuration sub-information is any of the multiple pieces of configuration sub-information, and the second configuration sub-information is one of the multiple pieces of configuration sub-information other than the first configuration sub-information.

19 Claims, 7 Drawing Sheets

(58) Field of Classification Search
CPC ............ H04W 76/15; H04W 36/0055; H04W 36/0069
See application file for complete search history.

(56) References Cited

U.S. PATENT DOCUMENTS

| | | | |
|---|---|---|---|
| 2022/0225191 A1* | 7/2022 | Shi ................. | H04W 36/00837 |
| 2022/0408325 A1* | 12/2022 | Da Silva ........... | H04W 36/0069 |
| 2023/0300691 A1* | 9/2023 | Eklöf ............... | H04W 36/0069 370/331 |
| 2023/0300694 A1* | 9/2023 | Fan .................. | H04W 36/08 455/436 |

OTHER PUBLICATIONS

WO 2021/086254 A1 (Year: 2021).*
First Office Action of Chinese patent application No. CN202011638559.9 dated Jan. 31, 2024.
First Search Report of Chinese patent application No. CN202011638559.9 dated Jan. 29, 2024.
ZTE Corporation, Sanechips "Report of [Post111-e] [911] [NTN] Connected mode aspects (ZTE)"3GPP TSG-RAN WG2 Meeting #112E R2-2009803 Oct. 22, 2020.

* cited by examiner

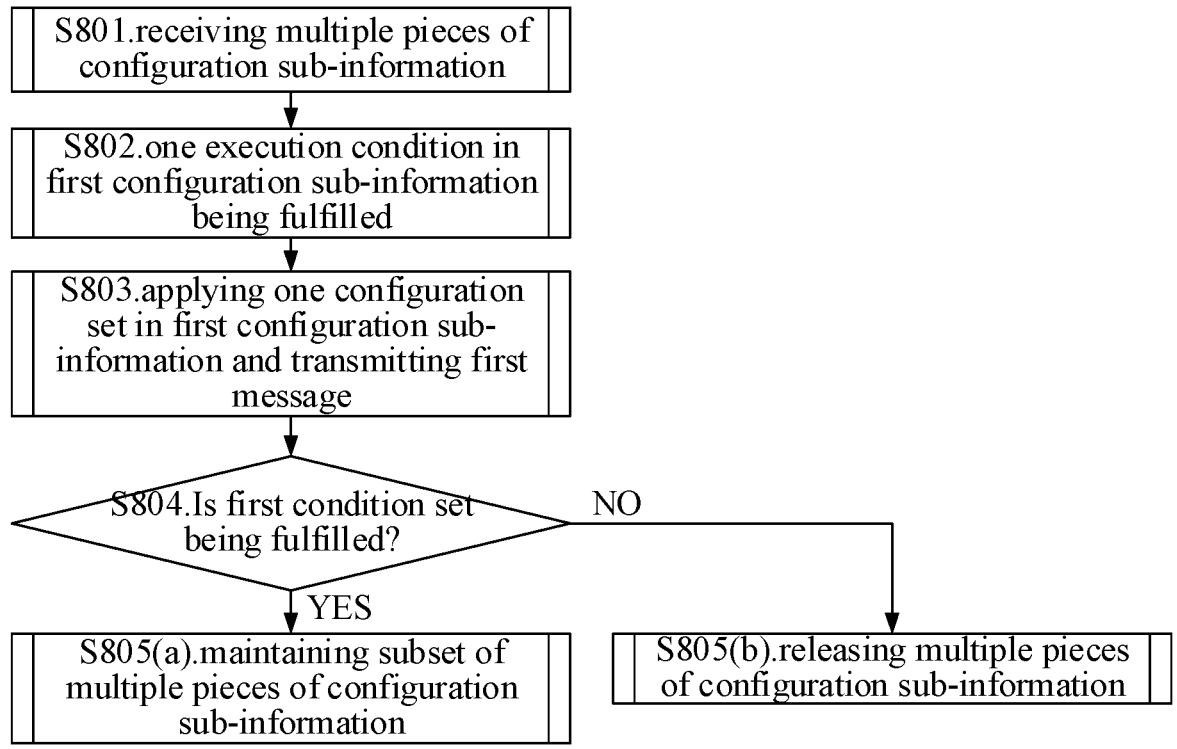
FIG. 8
The first condition set ←related to→ at least one of cell parameter of first cell or cell parameter of second cell
FIG. 9
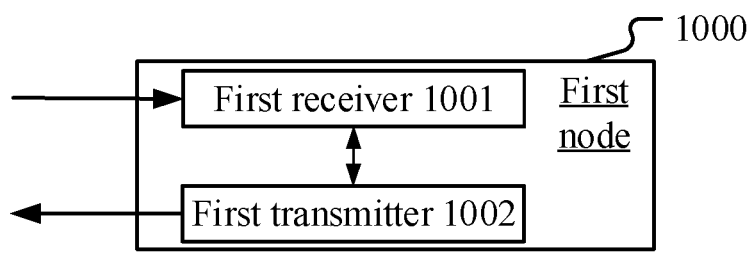
FIG. 10

CONDITIONAL RECONFIGURATION RELEASE METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202011638559.9, filed on Dec. 31, 2020, the full disclosure of which is incorporated herein by reference.

BACKGROUND

Technical Field

The present disclosure relates to transmission methods and devices in wireless communication systems, and in particular to a method and a device for conditional reconfiguration release.

Related Art

Traditionally, in a process of cell handover, when a User Equipment (UE) is in an RRC_Connected state (RRC being an abbreviation of Radio Resource Control), a base station can, based on measurement results by the UE, decide whether to perform a handover of the UE from a source cell to a target cell. The procedure of handover consists of three stages: Handover Preparation, Handover Execution and Handover Completion. With the communications requests becoming more extensive and demanding, the 3rd Generation Partner Project (3GPP) kicks off studies on Non-Terrestrial Network (NTN), and at the 3GPP RAN #80 conference it was decided that a study item (SI) of solutions to New Radio (NR)-supported NTN shall be conducted, as a continuity of the previously proposed NR-supported NTN SI (RP-171450). Herein the mobility of NTN is an important focus of studies.

SUMMARY

In NTN, the adoption of Conditional Handover based on Conditional Reconfiguration avoids potential transmission delay incurred by the stage of Handover Preparation in the traditional handover procedure, thus cutting down the Interruption Interval in transmission. In NTN, due to the complicated wireless environment and diverse handover scenarios, it is necessary to figure out a way of enhancement on further reducing handover delay.

To address the above problem, the present disclosure provides a solution. The statement above only took NTN scenarios for example, though; the present disclosure is also applicable to scenarios of terrestrial transmissions, where similar technical effects can be achieved. Additionally, the adoption of a unified solution for various scenarios contributes to the reduction of hardcore complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:

receiving multiple pieces of configuration sub-information, of which each piece of configuration sub-information comprises one execution condition and one configuration set; and in instances when the execution condition in first configuration sub-information is fulfilled, applying the configuration set in the first configuration sub-information, and transmitting a first message;

in instances when a first condition set is fulfilled after transmitting the first message, maintaining a subset of the multiple pieces of configuration sub-information, the subset of the multiple pieces of configuration sub-information at least comprising second configuration sub-information;

herein, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, a problem to be solved in the present disclosure includes: how to further reduce handover delay.

In one embodiment, a problem to be solved in the present disclosure includes: how to lessen transmission interruption time.

In one embodiment, characteristics of the above method include: upon completion of a conventional or a conditional handover, the UE will conditionally retain already-configured conditional reconfiguration.

In one embodiment, an advantage of the above method includes: guaranteeing the continuity of services.

In one embodiment, an advantage of the above method includes: providing candidate cells for the UE as many as possible.

In one embodiment, an advantage of the above method includes: avoiding the occurrence of radio link failure (RLF).

In one embodiment, an advantage of the above method includes: shortening the time for RRC connection reestablishment.

According to one aspect of the present disclosure, characterized in comprising:

in instances when the execution condition in first configuration sub-information is fulfilled, transmitting a second message; and receiving a third message;

herein, the second message is used for a random access procedure; a condition in the first condition set comprises that the random access procedure is successfully completed; the third message being associated with a first identifier is used to determine that the random access procedure is successfully completed.

According to one aspect of the present disclosure, characterized in comprising:

as a response to the action of maintaining a subset of the multiple pieces of configuration sub-information, transmitting first information; the first information indicates that the subset of the multiple pieces of configuration sub-information is maintained.

According to one aspect of the present disclosure, characterized in comprising:

receiving second information, the second information being used to indicate maintenance of the subset of the multiple pieces of configuration sub-information; a condition in the first condition set comprises the second information being received.

According to one aspect of the present disclosure, characterized in that the first condition set is related to at least one of a cell parameter of the first cell or a cell parameter of the second cell; the cell parameter comprises at least one of a cell type, a cell height, or a cell orbit or a cell delay, or a cell ephemeris.

According to one aspect of the present disclosure, characterized in comprising:

receiving a first signaling, the first signaling indicating a first time length; when the subset of the multiple pieces of configuration sub-information is maintained for up to the first time length, releasing the subset of the multiple pieces of configuration sub-information;

herein, the first time length comprises a positive integer number of slots.

According to one aspect of the present disclosure, characterized in comprising:

receiving third configuration sub-information; as a response to the action of receiving the third configuration sub-information, releasing the subset of the multiple pieces of configuration sub-information;

herein, the third configuration sub-information comprises one execution condition and one configuration set, and the third configuration sub-information is different from any of the multiple pieces of configuration sub-information, the third configuration sub-information being associated with a third cell.

The present disclosure provides a method in a second node for wireless communications, comprising:

transmitting multiple pieces of configuration sub-information, of which each piece of configuration sub-information comprises one execution condition and one configuration set;

herein, when the execution condition in first configuration sub-information is fulfilled, the configuration set in the first configuration sub-information is applied and a first message is transmitted; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

According to one aspect of the present disclosure, characterized in that in instances when the execution condition in first configuration sub-information is fulfilled, a second message is transmitted; and a third message is received; the second message is used for a random access procedure; a condition in the first condition set comprises that the random access procedure is successfully completed; the third message being associated with a first identifier is used to determine that the random access procedure is successfully completed.

According to one aspect of the present disclosure, characterized in that as a response to the action of a subset of the multiple pieces of configuration sub-information being maintained, first information is transmitted; the first information indicates that the subset of the multiple pieces of configuration sub-information is maintained.

According to one aspect of the present disclosure, characterized in comprising:

transmitting second information, the second information being used to indicate maintenance of the subset of the multiple pieces of configuration sub-information; a condition in the first condition set comprises the second information being received.

According to one aspect of the present disclosure, characterized in that the first condition set is related to at least one of a cell parameter of the first cell or a cell parameter of the second cell; the cell parameter comprises at least one of a cell type, a cell height, or a cell orbit or a cell delay, or a cell ephemeris.

According to one aspect of the present disclosure, characterized in comprising:

transmitting a first signaling, the first signaling indicating a first time length; when the subset of the multiple pieces of configuration sub-information is maintained for up to the first time length, releasing the subset of the multiple pieces of configuration sub-information;

herein, the first time length comprises a positive integer number of slots.

According to one aspect of the present disclosure, characterized in that third configuration sub-information is received; as a response to the action of the third configuration sub-information being received, the subset of the multiple pieces of configuration sub-information is released; the third configuration sub-information comprises one execution condition and one configuration set, and the third configuration sub-information is different from any of the multiple pieces of configuration sub-information, the third configuration sub-information being associated with a third cell.

The present disclosure provides a method in a third node for wireless communications, comprising:

receiving a first message;

herein, multiple pieces of configuration sub-information are received, with each piece of configuration sub-information comprising one execution condition and one configuration set; when the execution condition in first configuration sub-information is fulfilled, the configuration set in the first configuration sub-information is applied; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

According to one aspect of the present disclosure, characterized in comprising:

in instances when the execution condition in first configuration sub-information is fulfilled, receiving a second message; and transmitting a third message;

herein, the second message is used for a random access procedure; a condition in the first condition set comprises that the random access procedure is successfully completed; the third message being associated with a first identifier is used to determine that the random access procedure is successfully completed.

According to one aspect of the present disclosure, characterized in comprising:

as a response to the action of a subset of the multiple pieces of configuration sub-information being maintained, receiving first information; the first information indicates that the subset of the multiple pieces of configuration sub-information is maintained.

According to one aspect of the present disclosure, characterized in that second information is received, the second information being used to indicate maintenance of the subset of the multiple pieces of configuration sub-information; a condition in the first condition set comprises the second information being received.

According to one aspect of the present disclosure, characterized in that the first condition set is related to at least one of a cell parameter of the first cell or a cell parameter of the second cell; the cell parameter comprises at least one of a cell type, a cell height, or a cell orbit or a cell delay, or a cell ephemeris.

According to one aspect of the present disclosure, characterized in that a first signaling is received, the first signaling indicating a first time length; when the subset of the multiple pieces of configuration sub-information is maintained for up to the first time length, releasing the subset of the multiple pieces of configuration sub-information;

herein, the first time length comprises a positive integer number of slots.

According to one aspect of the present disclosure, characterized in comprising:

transmitting third configuration sub-information;

herein, upon reception of the third configuration sub-information, the subset of the multiple pieces of configuration sub-information is released; the third configuration sub-information comprises one execution condition and one configuration set, and the third configuration sub-information is different from any of the multiple pieces of configuration sub-information, the third configuration sub-information being associated with a third cell.

The present disclosure provides a first node for wireless communications, comprising:

a first receiver, receiving multiple pieces of configuration sub-information, of which each piece of configuration sub-information comprises one execution condition and one configuration set; and a first transmitter, in instances when the execution condition in first configuration sub-information is fulfilled, applying the configuration set in the first configuration sub-information, and transmitting a first message;

the first receiver, in instances when a first condition set is fulfilled after transmitting the first message, maintaining a subset of the multiple pieces of configuration sub-information, the subset of the multiple pieces of configuration sub-information at least comprising second configuration sub-information;

herein, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

The present disclosure provides a second node for wireless communications, comprising:

the second transmitter, transmitting multiple pieces of configuration sub-information, of which each piece of configuration sub-information comprises one execution condition and one configuration set;

herein, when the execution condition in first configuration sub-information is fulfilled, the configuration set in the first configuration sub-information is applied and a first message is transmitted; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

The present disclosure provides a third node for wireless communications, comprising:

a third receiver, receiving a first message;

herein, multiple pieces of configuration sub-information are received, with each piece of configuration sub-information comprising one execution condition and one configuration set; when the execution condition in first configuration sub-information is fulfilled, the configuration set in the first configuration sub-information is applied; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, compared with the prior art, the present disclosure is advantageous in the following aspects:

ensuring service continuity;

ensuring the availability of candidate cells for the UE to the best of one's ability;

preventing RLF from occurring;

narrowing the time gap for RRC connection reestablishment.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram about whether a subset of multiple pieces of configuration sub-information is maintained according to one embodiment of the present disclosure.

FIG. 9 illustrates a schematic diagram of a first condition set relating to at least one of a cell parameter of a first cell or a cell parameter of a second cell according to one embodiment of the present disclosure.

FIG. 10 illustrates a structure block diagram of a processing device used in a first node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
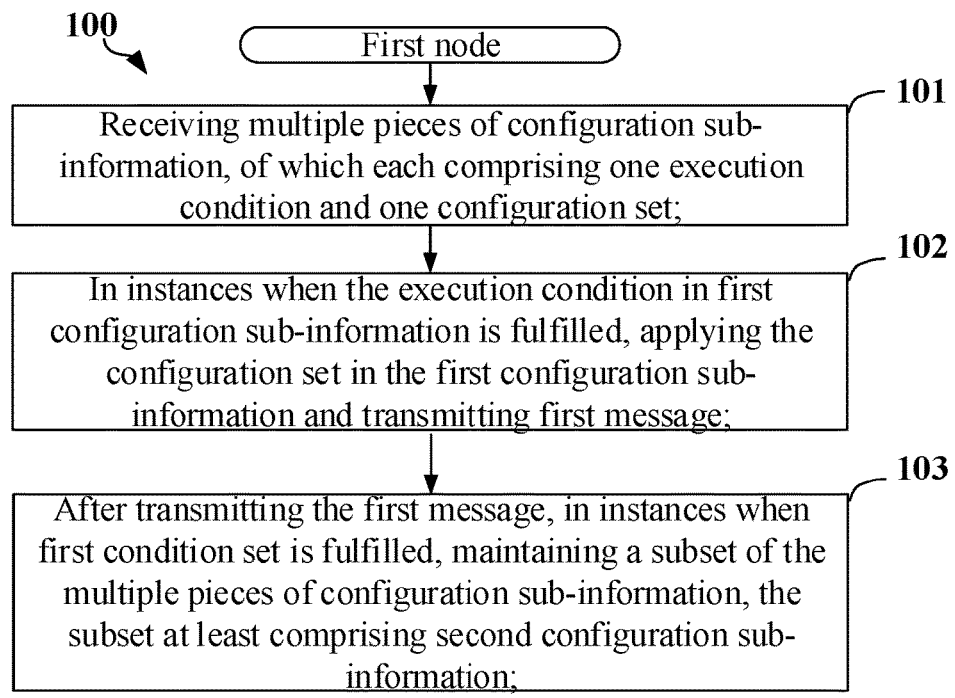
FIG. 1 illustrates a flowchart of transmission of multiple pieces of configuration sub-information and a first message according to one embodiment of the present disclosure.

Embodiment 1 illustrates a flowchart of transmission of multiple pieces of configuration sub-information and a first message according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, in step 101, a first node in the present disclosure receives multiple pieces of configuration sub-information, of which each piece of configuration sub-information comprises one execution condition and one configuration set; and in step 102, in instances when the execution condition in first configuration sub-information is fulfilled, applies the configuration set in the first configuration sub-information, and transmits a first message; and in step 103, in instances when a first condition set is fulfilled after transmitting the first message, maintains a subset of the multiple pieces of configuration sub-information, the subset of the multiple pieces of configuration sub-information at least comprising second configuration sub-information; herein, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, receiving multiple pieces of configuration sub-information, of which each piece of configuration sub-information comprises one execution condition and one configuration set; and in instances when the execution condition in first configuration sub-information is fulfilled, applying the configuration set in the first configuration sub-information, and transmitting a first message; in instances when a first condition set is fulfilled after transmitting the first message, maintaining a subset of the multiple pieces of configuration sub-information and releasing the first configuration sub-information, the subset of the multiple pieces of configuration sub-information at least comprising second configuration sub-information.

In one embodiment, receiving multiple pieces of configuration sub-information, of which each piece of configuration sub-information comprises one execution condition and one configuration set; and in instances when the execution condition in first configuration sub-information is fulfilled, applying the configuration set in the first configuration sub-information, and transmitting a first message; in instances when a first condition set is fulfilled after transmitting the first message, maintaining a subset of the multiple pieces of configuration sub-information and releasing a first subset of the multiple pieces of configuration sub-information, the first subset of the multiple pieces of configuration sub-information at least comprising the first configuration sub-information, the subset of the multiple pieces of configuration sub-information at least comprising second configuration sub-information, there isn't a same piece of configuration sub-information shared by the first subset of the multiple pieces of configuration sub-information and the subset of the multiple pieces of configuration sub-information.

In one embodiment, transmitter(s) for the multiple pieces of configuration sub-information comprises(comprise) a maintenance base station for a first serving cell.

In one subembodiment, the first serving cell includes a source cell of the first node.

In one subembodiment, the first serving cell includes a serving cell of the first node.

In one embodiment, the serving cell in the present disclosure comprises a cell in a Master Cell Group (MCG).

In one embodiment, the serving cell in the present disclosure comprises a cell in a Secondary Cell Group (SCG).

In one embodiment, the serving cell in the present disclosure comprises a Secondary Cell (SCell).

In one embodiment, the serving cell in the present disclosure comprises a Special Cell (SpCell).

In one subembodiment, the SpCell comprises a Primary Cell (PCell).

In one subembodiment, the SpCell comprises a Primary SCG Cell (PSCell).

In one embodiment, the multiple pieces of configuration sub-information are used for Conditional Reconfiguration.

In one subembodiment, the Conditional Reconfiguration comprises Conditional Handover (CHO).

In one subembodiment, the Conditional Reconfiguration comprises Conditional PSCell Change (CPC).

In one subembodiment, the Conditional Reconfiguration comprises Conditional PSCell Addition (CPA).

In one embodiment, the action of receiving multiple pieces of configuration sub-information comprises: receiving an RRC message, the RRC message comprising the multiple pieces of configuration sub-information.

In one embodiment, the action of receiving multiple pieces of configuration sub-information comprises: receiving more than one RRC message, the more than one RRC message comprising the multiple pieces of configuration sub-information.

In one embodiment, the action of receiving multiple pieces of configuration sub-information comprises: receiving multiple RRC messages, the RRC messages comprising the multiple pieces of configuration sub-information.

In one embodiment, transmitter(s) for the multiple pieces of configuration sub-information comprises(comprise) a maintenance base station for a source serving cell of the first node.

In one embodiment, the multiple pieces of configuration sub-information are transmitted via an air interface.

In one embodiment, the multiple pieces of configuration sub-information are transmitted via an antenna port.

In one embodiment, the multiple pieces of configuration sub-information comprise one or more Downlink (DL) signals.

In one embodiment, the multiple pieces of configuration sub-information comprise one or more Sidelink (SL) signals.

In one embodiment, the multiple pieces of configuration sub-information comprise one or more RRC messages.

In one embodiment, the multiple pieces of configuration sub-information comprise all or part of an RRC message.

In one embodiment, the multiple pieces of configuration sub-information comprise all or part of multiple RRC messages.

In one embodiment, the multiple pieces of configuration sub-information are multiple fields in a same RRC message.

In one embodiment, the multiple pieces of configuration sub-information are multiple fields of a same Information Element (IE) in a same RRC message.

In one embodiment, the multiple pieces of configuration sub-information are received simultaneously.

In one embodiment, the multiple pieces of configuration sub-information are not received simultaneously.

In one embodiment, the multiple pieces of configuration sub-information are received through a same RRC message.

In one embodiment, the multiple pieces of configuration sub-information are received through multiple RRC messages.

In one subembodiment, the number of the multiple pieces of configuration sub-information is equal to the number of the multiple RRC messages.

In one subembodiment, the number of the multiple pieces of configuration sub-information is unequal to the number of the multiple RRC messages.

In one embodiment, the multiple pieces of configuration sub-information are all or part of an RRC message, the RRC message comprising either a RRCReconfiguration message or a RRCConnectionReconfiguration message.

In one embodiment, the multiple pieces of configuration sub-information are all or part of an RRC message, the RRC message comprising a DLInformationTransferMRDC message.

In one embodiment, the multiple pieces of configuration sub-information are all or part of an IE in an RRC message, the IE's name including ConditionalReconfiguration.

In one embodiment, the multiple pieces of configuration sub-information are all or part of an IE in an RRC message, the IE's name including condReconfigToAddModList or condReconfigurationToAddModList.

In one embodiment, the multiple pieces of configuration sub-information are all or part of an IE in an RRC message, the IE's name including attemptCondReconfig or attemptCondReconf.

In one embodiment, the multiple pieces of configuration sub-information are all or part of more than one RRC message, and one of the more than one RRC message comprises either a RRCReconfiguration message or a RRCConnectionReconfiguration message.

In one embodiment, the multiple pieces of configuration sub-information are all or part of more than one RRC message, and one of the more than one RRC message comprises a DLInformationTransferMRDC message.

In one embodiment, the multiple pieces of configuration sub-information are all or part of more than one IE in more than one RRC message, a name of one of the more than one IE including ConditionalReconfiguration.

In one embodiment, the multiple pieces of configuration sub-information are all or part of more than one IE in more than one RRC message, a name of one of the more than one IE including condReconfigToAddModList or condReconfigurationToAddModList.

In one embodiment, the multiple pieces of configuration sub-information are all or part of more than one IE in more than one RRC message, a name of one of the more than one IE including attemptCondReconfig or attemptCondReconf.

In one embodiment, each of the multiple pieces of configuration sub-information comprises one or more of IEs in an RRC message.

In one embodiment, each of the multiple pieces of configuration sub-information comprises one or more of fields in an RRC message.

In one embodiment, each of the multiple pieces of configuration sub-information comprises a IE in an RRC message, the IE's name including CondReconfigToAddMod or CondReconfigurationAddMod.

In one embodiment, each of the multiple pieces of configuration sub-information comprises an IE in an RRC message, the IE's name including CondReconfigId or CondReconfigurationId.

In one embodiment, each of the multiple pieces of configuration sub-information comprises a field in an RRC message, the field's name including condExecutionCond or triggerCondition.

In one embodiment, each of the multiple pieces of configuration sub-information comprises a field in an RRC message, the field's name including condRRCReconfig or condReconfigurationToApply.

In one embodiment, the phrase that each piece of configuration sub-information of the multiple pieces of configuration sub-information comprises one execution condition and one configuration set comprises: a field in each piece of configuration sub-information of the multiple pieces of configuration sub-information is used to indicate the execution condition, while another field in the each piece of configuration sub-information of the multiple pieces of configuration sub-information is used to indicate the configuration set.

In one embodiment, the phrase that each piece of configuration sub-information of the multiple pieces of configuration sub-information comprises one execution condition and one configuration set comprises: the execution condition and the configuration set are respectively fields or IEs comprised in any one of the multiple pieces of configuration sub-information.

In one embodiment, the phrase that each piece of configuration sub-information of the multiple pieces of configuration sub-information comprises one execution condition and one configuration set comprises: the execution condition and the configuration set are respectively configured by two fields or IEs comprised in any one of the multiple pieces of configuration sub-information.

In one embodiment, the phrase that each piece of configuration sub-information of the multiple pieces of configuration sub-information comprises one execution condition and one configuration set comprises: each of the multiple pieces of configuration sub-information comprises a field in an RRC message, the field being used to indicate the execution condition; each of the multiple pieces of configuration sub-information comprises another field in an RRC message, the field being used to indicate the configuration set.

In one embodiment, the execution condition comprises a triggering condition for a conditional reconfiguration.

In one embodiment, an execution condition in each of the multiple pieces of configuration sub-information is associated with a measurement identifier, i.e., a MeasId.

In one embodiment, the execution condition is associated with a triggering event.

In one embodiment, the execution condition is associated with multiple triggering events.

In one embodiment, the execution condition is associated with two triggering events.

In one embodiment, the execution condition comprises a condition for entry into a triggering event.

In one subembodiment, the triggering event is associated with a measId.

In one subembodiment, the triggering event comprises an AX Event in TS 38.331 or TS 36.331, where X is a positive integer no greater than 100.

In one subembodiment, the triggering event comprises a CondEvent AX Event in TS 38.331 or TS 36.331, where X is a positive integer no greater than 100.

In one subembodiment, the triggering event comprises a cond event.

In one embodiment, one field or multiple fields comprised in an RRC message are used to determine the execution condition, names of the one or more fields including at least one of condExecutionCond, or MeasId, or CondTriggerConfig, or condEventId or rsType.

In one embodiment, one field or multiple fields comprised in an RRC message are used to determine the execution condition, names of the one or more fields including at least one of triggerCondition, or MeasId, or condReconfigurationToApply, or CondReconfigurationTriggerEUTRA, or condEventId.

In one embodiment, one IE or multiple IEs comprised in an RRC message are used to determine the execution condition, names of the one or more IEs including at least one of ReportConfigEUTRA, or ReportConfigId, or ReportConfigNR, or ReportConfigId, or ReportConfigInterRAT, or ReportConfigToAddModList.

In one embodiment, one field or multiple fields comprised in an RRC message are used to determine the execution condition, names of the one or more fields including at least one of condEventA3, or a3-Offset, or hysteresis, or timeToTrigger, or condEventA5, or a5-Threshold1, or a5-Threshold2, or hysteresis, or timeToTrigger, or MeasTriggerQuantityOffset, or Hysteresis, or TimeToTrigger, or MeasTriggerQuantity, or ssb, or csi-rs, or rsrp, or rsrq or sinr, or, RSRP-Range, or RSRQ-Range, or SINR-Range or ThresholdEUTRA, or threshold-RSRP, or threshold-RSRQ, or CSI-RSRP-Range.

In one embodiment, the execution condition comprises: $Mn+Ofn+Ocn-Hys>Mp+Ofp+Ocp+Off$.

In one subembodiment, for the definition of at least one of the Mn, or the Ofn, or the Ocn, or the Hys, or the Mp, or the Ofp, or the Ocp or the Off, refer to 3GPP TS 38.331, or 3GPP TS 36.331.

In one subembodiment, at least one of the Mn, or the Ofn, or the Ocn, or the Hys, or the Mp, or the Ofp, or the Ocp or the Off is configured through each piece of configuration sub-information of the multiple pieces of configuration sub-information.

In one embodiment, the execution condition comprises: $Mp+Hys<Thresh1$.

In one subembodiment, for the definition of at least one of the Hys, or the Mp or the Thresh1, refer to 3GPP TS 38.331, or 3GPP TS 36.331.

In one subembodiment, at least one of the Hys, or the Mp or the Thresh1 is configured through each piece of configuration sub-information of the multiple pieces of configuration sub-information.

In one embodiment, the execution condition comprises: $Mn+Ofn+Ocn-Hys>Thresh2$.

In one subembodiment, for the definition of at least one of the Mn, or the Ofn, or the Ocn, or the Hys, or the Thresh1, refer to 3GPP TS 38.331, or 3GPP TS 36.331.

In one subembodiment, at least one of the Mn, or the Ofn, or the Ocn, or the Hys or the Thresh1 is configured through each piece of configuration sub-information of the multiple pieces of configuration sub-information.

In one embodiment, the execution condition is related to a first threshold.

In one embodiment, the first threshold is used to determine the execution condition.

In one embodiment, the first threshold is related to at least one of a position of the first node U01, the cell ephemeris or time.

In one embodiment, the first threshold is time-related.

In one embodiment, the first threshold comprises a first instant of time.

In one subembodiment, when the first instant of time is not yet reached, the first threshold is unfulfilled.

In one subembodiment, upon reaching the first instant of time, the first threshold is fulfilled.

In one embodiment, the first threshold is position-related.

In one embodiment, the first threshold is used to determine a first zone.

In one subembodiment, the first zone comprises a boundary position of the first serving cell.

In one subembodiment, when a position of the first node belongs to a first zone, the given measurement information fulfills the first threshold.

In one subembodiment, when a position of the first node does not belong to a first zone, the given measurement information does not fulfill the first threshold.

In one subembodiment, when a distance between a position of the first node and a given position is no smaller than a second threshold and no greater than a second threshold, the position of the first node belongs to the first zone.

In one subembodiment, a unit of measurement of the first threshold and the second threshold includes meters (m).

In one subembodiment, the given position comprises an intersection point of a vertical line along gravitational direction of the NTN node and an elevation at which the first node is located.

In one subembodiment, the given position is related to both a height of the NTN node and an elevation of the first node.

In one subembodiment, the given measurement information comprises the first measurement information and the second measurement information.

In one embodiment, the configuration set comprises a random access configuration for a cell corresponding to the configuration set.

In one embodiment, the configuration set comprises a measurement configuration for a cell corresponding to the configuration set.

In one embodiment, the configuration set comprises a cell identifier for a cell corresponding to the configuration set.

In one embodiment, the configuration set comprises an uplink common configuration for a cell corresponding to the configuration set.

In one embodiment, the configuration set comprises a downlink common configuration for a cell corresponding to the configuration set.

In one embodiment, the configuration set comprises an RRC Reconfiguration message.

In one embodiment, the configuration set comprises an RRC message, the RRC message's name including RRCReconfiguration or RRCConnectionReconfiguration.

In one embodiment, the configuration set comprises one IE in an RRC message, the IE's name including at least one of fullConfig, or masterCellGroup, or CellGroupConfig, or dedicatedNAS-MessageList, or secondaryCellGroup, or measConfig, or ServCellIndex, or ServingCellConfig, or RACH-ConfigDedicated, or physCellId, or DownlinkConfigCommon, or UplinkConfigCommon, or RACH-Config-Generic, or RACH-ConfigGenericTwoStepRA, or MobilityControlInfo, or MeasConfig or RadioResourceConfigDedicated.

In one embodiment, the configuration set comprises one field in an RRC message, the field's name including at least one of SpCellConfig, or servCellIndex, or reconfigurationWithSync, newUE-Identity, rach-ConfigDedicated, or occasions, or ssb-perRACH-Occasion, or occasionsTwoStepRA, or ssb-PerRACH-OccasionTwoStepRA, or MobilityControlInfoSCG, or ue-IdentitySCG.

In one embodiment, it is determined according to a measurement result for a given reference signal that the execution condition in the first configuration sub-information is fulfilled.

In one subembodiment, the given reference signal comprises at least one of an ssb, or a Synchronisation Signal (SS)/Physical broadcast channel (PBCH) block, or a csi-rs or a Cell Reference Signal (CRS).

In one subembodiment, the measurement result comprises at least one of a Reference Signal Received Power (RSRP), or a Reference Signal Received Quality (RSRQ), or a Signal to Noise and Interference Ratio (SINR), or a Channel Status Information reference signal resource indicator (CRI) or a Channel Busy Ratio (CBR).

In one embodiment, it is determined according to positional information of the first node and the cell parameter of the first cell that the execution condition in the first configuration sub-information is fulfilled.

In one embodiment, it is determined according to positional information of the first node and the cell parameter of the first cell, and a measurement result for a given reference signal that the execution condition in the first configuration sub-information is fulfilled.

In one embodiment, the phrase that the execution condition in first configuration sub-information is fulfilled comprises: a triggering event in the first configuration sub-information is satisfied.

In one embodiment, the phrase that the execution condition in first configuration sub-information is fulfilled comprises: the execution condition in first configuration sub-information meets condition(s) for application of the configuration set.

In one embodiment, the phrase of applying the configuration set in the first configuration sub-information comprises: applying parameters in the configuration set.

In one embodiment, the phrase of applying the configuration set in the first configuration sub-information comprises: performing procedure of RRC Reconfiguration.

In one embodiment, the phrase of applying the configuration set in the first configuration sub-information comprises: performing downlink synchronization.

In one embodiment, the phrase of applying the configuration set in the first configuration sub-information comprises: employing a specific BCCH configuration.

In one embodiment, the phrase of applying the configuration set in the first configuration sub-information comprises: applying the value of newUE-Identity.

In one embodiment, the phrase of applying the configuration set in the first configuration sub-information comprises: applying the value of an IE or a field in the configuration set.

In one embodiment, a receiver for receiving the first message comprises a maintenance base station for the first cell.

In one embodiment, the first message is transmitted via an air interface.

In one embodiment, the first message is transmitted via an antenna port.

In one embodiment, the first message comprises an Uplink (UL) signal.

In one embodiment, the first message comprises a Sidelink (SL) signal.

In one embodiment, the first message comprises an RRC message.

In one embodiment, the first message is transmitted by a Signaling Radio Bearer 1 (SRB1).

In one embodiment, the first message is transmitted by a Signaling Radio Bearer 3 (SRB3).

In one embodiment, the first message comprises a RRCReconfigurationComplete message or a RRCConnectionReconfigurationComplete message.

In one embodiment, the first message comprises a ULInformationTransferMRDC message, the ULInformationTransferMRDC message comprising either a RRCReconfigurationComplete message or a RRCConnectionReconfigurationComplete message.

In one embodiment, the phrase that the first message is used to indicate completion of a radio link control reconfiguration comprises: the first message is used to determine the completion of the radio link control reconfiguration.

In one embodiment, the phrase that the first message is used to indicate completion of a radio link control reconfiguration comprises: the first message is used to determine completion of a handover.

In one embodiment, the phrase of after transmitting the first radio signal comprises: upon reception of a Hybrid Automatic Repeat Request (HARQ) Acknowledgement (ACK) for the first radio signal.

In one embodiment, the phrase of after transmitting the first radio signal comprises: upon reception of a Radio Link Control (RLC) ACK for the first radio signal.

In one embodiment, the phrase of after transmitting the first radio signal comprises: upon reception of a Packet Data Convergence Protocol (PDCP) Sequence Number (SN) for the first radio signal.

In one embodiment, the phrase of after transmitting the first radio signal comprises: upon delivery of the first radio signal to a lower layer, the lower layer comprising at least one of a Physical layer (PHY), or a MAC, or an RLC, or a PDCP.

In one embodiment, the phrase of after transmitting the first radio signal comprises: upon successful transmission of the first radio signal.

In one embodiment, the first condition set comprises a positive integer number of condition(s).

In one embodiment, each condition being fulfilled in the first condition set is used to determine that the first condition set is fulfilled.

In one embodiment, no condition being fulfilled in the first condition set is used to determine that the first condition set is unfulfilled.

In one embodiment, the meaning of the first condition set being fulfilled comprises that at least the positive integer number of condition(s) is(are) being fulfilled.

In one embodiment, the meaning of the first condition set being fulfilled comprises that each condition comprised in the first condition set is being fulfilled.

In one embodiment, the action of maintaining a subset of the multiple pieces of configuration sub-information comprises: keeping everything in VarConditionalReconfig unchanged.

In one embodiment, the action of maintaining a subset of the multiple pieces of configuration sub-information comprises: keeping part of VarConditionalReconfig or VarConditionalReconfiguration unchanged.

In one embodiment, the action of maintaining a subset of the multiple pieces of configuration sub-information comprises: maintaining the subset of the multiple pieces of configuration sub-information stored in VarConditionalReconfig or VarConditionalReconfiguration.

In one embodiment, the action of maintaining a subset of the multiple pieces of configuration sub-information comprises: maintaining partial entries stored in VarConditionalReconfig or VarConditionalReconfiguration.

In one embodiment, the meaning of maintaining includes continuing to store.

In one embodiment, the meaning of maintaining includes continuing to keep.

In one embodiment, the meaning of maintaining includes continuing to retain.

In one embodiment, the meaning of maintaining includes not removing or giving up removing.

In one embodiment, the meaning of maintaining includes not deleting or giving up deleting.

In one embodiment, the meaning of maintaining includes not clearing or giving up clearing.

In one embodiment, the meaning of releasing includes removing.

In one embodiment, the meaning of releasing includes deleting.

In one embodiment, the meaning of releasing includes clearing.

In one embodiment, the meaning of releasing includes not continuing to store.

In one embodiment, the phrase that the subset of the multiple pieces of configuration sub-information at least comprises second configuration sub-information comprises: the subset of the multiple pieces of configuration sub-information only comprises the second configuration sub-information.

In one embodiment, the phrase that the subset of the multiple pieces of configuration sub-information at least comprises second configuration sub-information comprises: the subset of the multiple pieces of configuration sub-information comprises other configuration sub-information apart from the second configuration sub-information.

In one embodiment, the phrase of a subset of the multiple pieces of configuration sub-information comprises: all pieces of configuration sub-information among the multiple pieces of configuration sub-information.

In one embodiment, the phrase of a subset of the multiple pieces of configuration sub-information comprises: partial pieces of configuration sub-information among the multiple pieces of configuration sub-information.

In one embodiment, the phrase of a subset of the multiple pieces of configuration sub-information comprises: one piece of or multiple pieces of configuration sub-information among the multiple pieces of configuration sub-information.

In one embodiment, the phrase of a subset of the multiple pieces of configuration sub-information comprises: at least one piece of configuration sub-information among the multiple pieces of configuration sub-information.

In one embodiment, the subset of the multiple pieces of configuration sub-information comprises each of the multiple pieces of configuration sub-information other than the first configuration sub-information.

In one embodiment, the subset of the multiple pieces of configuration sub-information comprises part of the multiple pieces of configuration sub-information other than the first configuration sub-information.

In one embodiment, the phrase that the first configuration sub-information is any piece of configuration sub-information among the multiple pieces of configuration sub-information comprises: the first configuration sub-information is one of the multiple pieces of configuration sub-information.

In one embodiment, the phrase that the first configuration sub-information is any piece of configuration sub-information among the multiple pieces of configuration sub-information comprises: the first configuration sub-information belongs to the multiple pieces of configuration sub-information.

In one embodiment, the phrase that the second configuration sub-information is one piece of configuration sub-information among the multiple pieces of configuration sub-information different from the first configuration sub-information comprises: the second configuration sub-information is one piece of configuration sub-information among the multiple pieces of configuration sub-information, and the second configuration sub-information is different from the first configuration sub-information.

In one embodiment, the phrase that the second configuration sub-information is one piece of configuration sub-information among the multiple pieces of configuration sub-information different from the first configuration sub-information comprises: the second configuration sub-information and the first configuration sub-information are two different pieces of configuration sub-information among the multiple pieces of configuration sub-information.

In one embodiment, the phrase that the second configuration sub-information is one piece of configuration sub-information among the multiple pieces of configuration sub-information different from the first configuration sub-information comprises: the multiple pieces of configuration sub-information comprise the first configuration sub-information and the second configuration sub-information.

In one embodiment, at least one of the first cell or the second cell is a neighboring cell of the first serving cell.

In one embodiment, the first cell and the second cell are respectively candidate cells for the Conditional Reconfiguration.

In one embodiment, the phrase that the first configuration sub-information is associated with a first cell comprises: the first configuration sub-information is for the first cell.

In one embodiment, the phrase that the first configuration sub-information is associated with a first cell comprises: the first configuration sub-information is a configuration for the first cell.

In one embodiment, the phrase that the first configuration sub-information is associated with a first cell comprises: the first configuration sub-information carries a cell identifier of the first cell.

In one embodiment, the phrase that the second configuration sub-information is associated with a second cell comprises: the second configuration sub-information is for the second cell.

In one embodiment, the phrase that the second configuration sub-information is associated with a second cell comprises: the second configuration sub-information is a configuration for the second cell.

In one embodiment, the phrase that the second configuration sub-information is associated with a second cell comprises: the second configuration sub-information carries a cell identifier of the second cell.

In one embodiment, the phrase that a condition in the first condition set comprises transmitting the first message comprises: a condition for fulfilling the first condition set comprises the first message being transmitted.

In one embodiment, the phrase that a condition in the first condition set comprises transmitting the first message comprises: whether the first condition set is fulfilled depends upon whether the first message is being transmitted.

In one embodiment, the phrase that a condition in the first condition set comprises transmitting the first message comprises: the first message being transmitted is used to determine fulfillment of one condition among multiple conditions in the first condition set.

In one embodiment, the cell identifier in the present disclosure is comprised of a positive integer number of bits, the number being no greater than 10240.

In one embodiment, the cell identifier in the present disclosure includes a Physical Cell Identity (PCI).

In one embodiment, the cell identifier in the present disclosure is indicated by a field in an RRC message, the field's name including physCellId.

Embodiment 2

Figure 2:
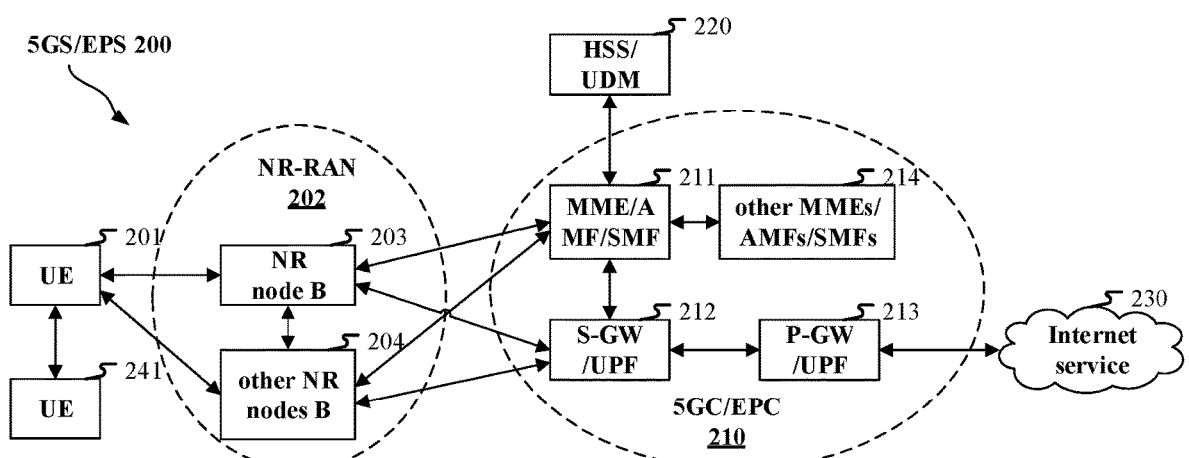
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MM4E)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a UE.

In one embodiment, the gNB203 corresponds to the second node in the present disclosure.

In one embodiment, the gNB204 corresponds to the third node in the present disclosure.

In one embodiment, the gNB203 is a BaseStation (BS).

In one embodiment, the gNB203 is a UE.

In one embodiment, the gNB203 is a relay.

In one embodiment, the gNB203 is a Gateway.

In one embodiment, the gNB204 is a BaseStation (BS).

In one embodiment, the gNB204 is a UE.

In one embodiment, the gNB204 is a relay.

In one embodiment, the gNB204 is a Gateway.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE comprises an aircraft.

In one embodiment, the UE comprises a vehicle-mounted terminal.

In one embodiment, the UE comprises a vessel.

In one embodiment, the UE comprises an Internet-of-Things (IoT) terminal.

In one embodiment, the UE comprises an Industrial IoT (IIoT) terminal.

In one embodiment, the UE is a piece of equipment supporting transmissions with low delay and high reliability.

In one embodiment, the UE comprises test equipment.

In one embodiment, the UE comprises a signaling test instrument.

In one embodiment, the base station supports transmissions in NTN.

In one embodiment, the base station supports transmissions in large-delay-difference networks.

In one embodiment, the base station supports transmissions in TN.

In one embodiment, the base station comprises a Macro Cellular base station.

In one embodiment, the base station comprises a Micro Cell base station.

In one embodiment, the base station comprises a Pico Cell base station.

In one embodiment, the base station comprises a Femtocell.

In one embodiment, the base station comprises a base station device supporting large time-delay difference.

In one embodiment, the base station comprises a flight platform.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling test instrument.

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises a L3 relay.

In one embodiment, the relay comprises a L2 relay.

In one embodiment, the relay comprises a Router.

In one embodiment, the relay comprises an Exchanger.

In one embodiment, the relay comprises a UE.

In one embodiment, the relay comprises a base station.

Embodiment 3

Figure 3:
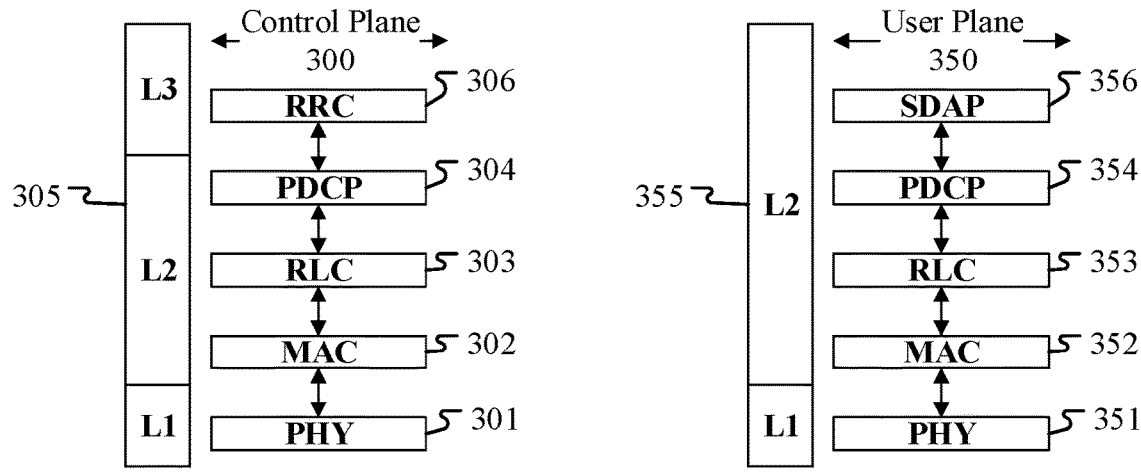
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, each of the multiple pieces of configuration sub-information is generated by the RRC 306.

In one embodiment, each of the multiple pieces of configuration sub-information is generated by the MAC302 or the MAC352.

In one embodiment, each of the multiple pieces of configuration sub-information is generated by the PHY301 or the PHY351.

In one embodiment, the third configuration sub-information in the present disclosure is generated by the RRC306.

In one embodiment, the third configuration sub-information in the present disclosure is generate by the MAC302 or the MAC352.

In one embodiment, the third configuration sub-information in the present disclosure is generate by the PHY301 or the PHY351.

In one embodiment, the first message in the present disclosure is generated by the RRC306.

In one embodiment, the first message in the present disclosure is generate by the MAC302 or the MAC352.

In one embodiment, the first message in the present disclosure is generated by the PHY301 or the PHY351.

In one embodiment, the second message in the present disclosure is generated by the RRC306.

In one embodiment, the second message in the present disclosure is generate by the MAC302 or the MAC352.

In one embodiment, the second message in the present disclosure is generated by the PHY301 or the PHY351.

In one embodiment, the third message in the present disclosure is generated by the RRC306.

In one embodiment, the third message in the present disclosure is generate by the MAC302 or the MAC352.

In one embodiment, the third message in the present disclosure is generated by the PHY301 or the PHY351.

In one embodiment, the first information in the present disclosure is generated by the RRC306.

In one embodiment, the first information in the present disclosure is generate by the MAC302 or the MAC352.

In one embodiment, the first information in the present disclosure is generate by the PHY301 or the PHY351.

In one embodiment, the second information in the present disclosure is generated by the RRC306.

In one embodiment, the second information in the present disclosure is generated by the MAC302 or the MAC352.

In one embodiment, the second information in the present disclosure is generated by the PHY301 or the PHY351.

In one embodiment, the first signaling in the present disclosure is generated by the RRC 306.

In one embodiment, the first signaling in the present disclosure is generate by the MAC302 or the MAC352.

In one embodiment, the first signaling in the present disclosure is generated by the PHY301 or the PHY351.

Embodiment 4

Figure 4:
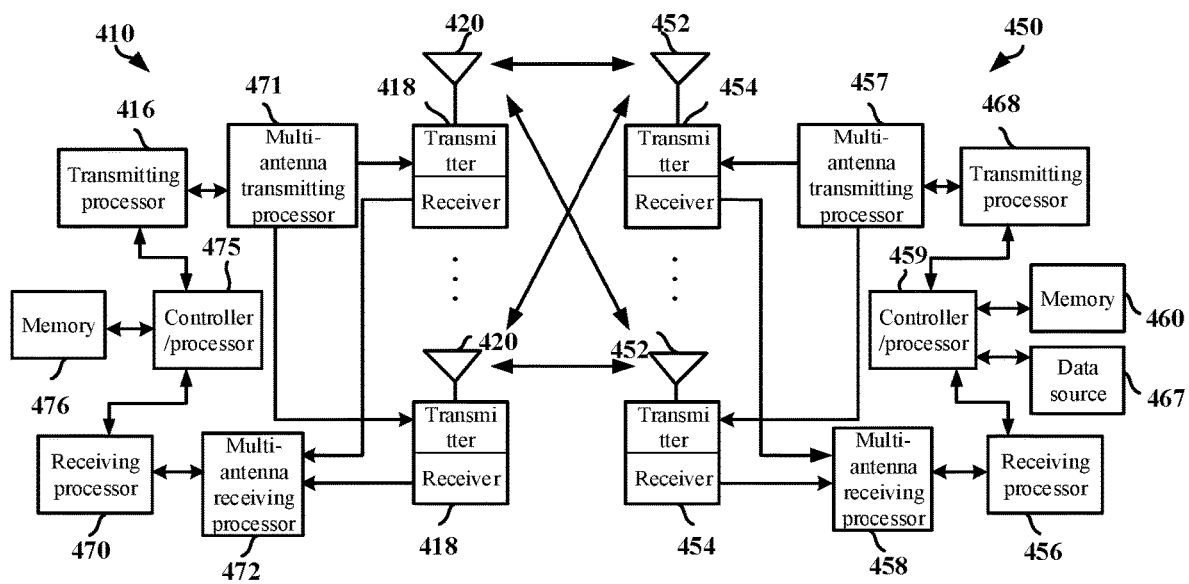
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor. the first communication device 450 at least: receives multiple pieces of configuration sub-information, of which each piece of configuration sub-information comprises one execution condition and one configuration set; and in instances when the execution condition in first configuration sub-information is fulfilled, applies the configuration set in the first configuration sub-information, and transmits a first message; in instances when a first condition set is fulfilled after transmitting the first message, maintains a subset of the multiple pieces of configuration sub-information, the subset of the multiple pieces of configuration sub-information at least comprising second configuration sub-information; herein, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the first communication node 450 comprises a memory that stores a computer readable instruction program, the computer readable instruction program generates actions when executed by at least one processor, which include: receiving multiple pieces of configuration sub-information, of which each piece of configuration sub-information comprises one execution condition and one configuration set; and in instances when the execution condition in first configuration sub-information is fulfilled, applying the configuration set in the first configuration sub-information, and transmitting a first message; in instances when a first condition set is fulfilled after transmitting the first message, maintaining a subset of the multiple pieces of configuration sub-information, the subset of the multiple pieces of configuration sub-information at least comprising second configuration sub-information; herein, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the first communication device 450 corresponds to the first node in the present disclosure.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: transmits multiple pieces of configuration sub-information, of which each piece of configuration sub-information comprises one execution condition and one configuration set; herein, when the execution condition in first configuration sub-information is fulfilled, the configuration set in the first configuration sub-information is applied and a first message is transmitted; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the second communication node 410 comprises a memory that stores a computer readable instruction program, the computer readable instruction program generates actions when executed by at least one processor, which include: transmitting multiple pieces of configuration sub-information, of which each piece of configuration sub-information comprises one execution condition and one configuration set; herein, when the execution condition in first configuration sub-information is fulfilled, the configuration set in the first configuration sub-information is applied and a first message is transmitted; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the second communication device 410 corresponds to the second node in the present disclosure.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: receives a first message; herein, multiple pieces of configuration sub-information are received, with each piece of configuration sub-information comprising one execution condition and one configuration set; when the execution condition in first configuration sub-information is fulfilled, the configuration set in the first configuration sub-information is applied; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the second communication node 410 comprises a memory that stores a computer readable instruction program, the computer readable instruction program generates actions when executed by at least one processor, which include: receiving a first message; herein, multiple pieces of configuration sub-information are received, with each piece of configuration sub-information comprising one execution condition and one configuration set; when the execution condition in first configuration sub-information is fulfilled, the configuration set in the first configuration sub-information is applied; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the second communication device 410 corresponds to the third node in the present disclosure.

In one embodiment, the antenna 452, the receiver 454, the receiving processor 456, and the controller/processor 459 are used for receiving any piece of configuration sub-information among the multiple pieces of configuration sub-information; at least one of the antenna 420, the transmitter 418, the transmitting processor 416 or the controller/processor 475 is used for transmitting any piece of configuration sub-information among the multiple pieces of configuration sub-information.

In one embodiment, the antenna 452, the transmitter 454, the transmitting processor 468 and the controller/processor 459 are used for transmitting the first message; at least one of the antenna 420, the receiver 418, the receiving processor 470 or the controller/processor 475 is used for receiving the first message.

In one embodiment, the antenna 452, the transmitter 454, the transmitting processor 468 and the controller/processor 459 are used for transmitting the second message; at least one of the antenna 420, the receiver 418, the receiving processor 470 or the controller/processor 475 is used for receiving the second message.

In one embodiment, the antenna 452, the receiver 454, the receiving processor 456, and the controller/processor 459 are used for receiving the third message; at least one of the antenna 420, the transmitter 418, the transmitting processor 416 or the controller/processor 475 is used for transmitting the third message.

In one embodiment, the antenna 452, the transmitter 454, the transmitting processor 468 and the controller/processor 459 are used for transmitting the first information; at least one of the antenna 420, the receiver 418, the receiving processor 470 or the controller/processor 475 is used for receiving the first information.

In one embodiment, the antenna 452, the receiver 454, the receiving processor 456, and the controller/processor 459 are used for receiving the second information; at least one of the antenna 420, the transmitter 418, the transmitting processor 416 or the controller/processor 475 is used for transmitting the second information.

In one embodiment, the antenna 452, the receiver 454, the receiving processor 456, and the controller/processor 459 are used for receiving the first signaling; at least one of the antenna 420, the transmitter 418, the transmitting processor 416 or the controller/processor 475 is used for transmitting the first signaling.

In one embodiment, the antenna 452, the receiver 454, the receiving processor 456, and the controller/processor 459 are used for receiving the third configuration sub-information; at least one of the antenna 420, the transmitter 418, the transmitting processor 416 or the controller/processor 475 is used for transmitting the third configuration sub-information.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5

Figure 5:
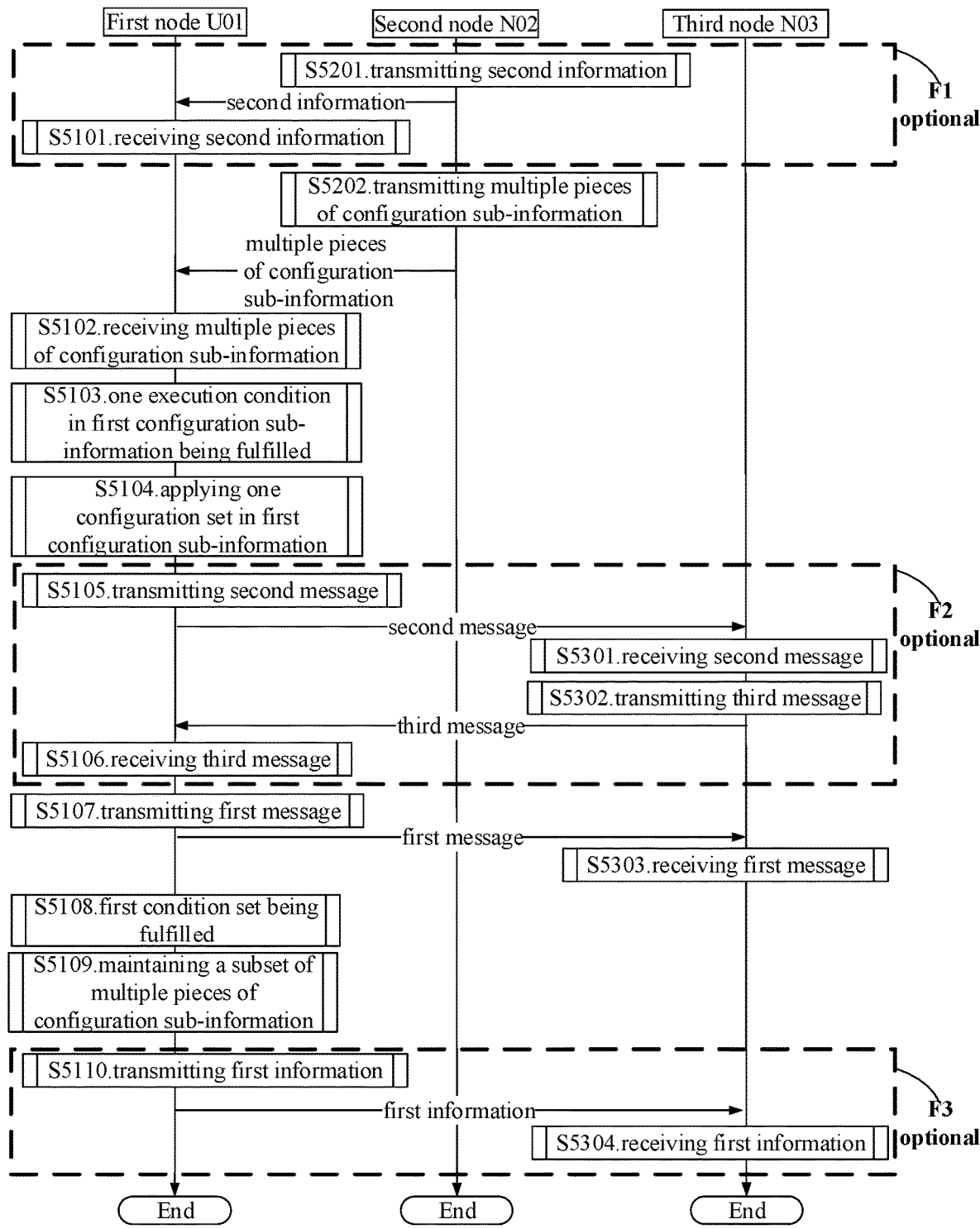
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. It should be particularly noted that the sequence illustrated herein does not set any limit to the signal transmission order or implementation order in the present disclosure.

The first node U01 receives second information in step S5101; receives multiple pieces of configuration sub-information in step S5102; in step S5103, the execution condition in first configuration sub-information being fulfilled; in step S5104, in instances when the execution condition in first configuration sub-information is fulfilled, applies the configuration set in the first configuration sub-information; in step S5105, in instances when the execution condition in first configuration sub-information is fulfilled, transmits a second message; and receives a third message in step S5106; in step S5107, in instances when the execution condition in first configuration sub-information is fulfilled, transmits a first message; and in step S5108, a first condition set being fulfilled; in step S5109, in instances when a first condition set is fulfilled after transmitting the first message, maintains a subset of the multiple pieces of configuration sub-information; in step S5110, as a response to the action of maintaining a subset of the multiple pieces of configuration sub-information, transmits first information.

The second node N02 transmits the second information in step S5201; and transmits the multiple pieces of configuration sub-information in step S5202.

The third node N03 receives the second message in step S5301; transmits the third message in step S5302; receives the first message in step S5303; and receives the first information in step S5304.

In Embodiment 5, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message; the second message is used for a random access procedure; a condition in the first condition set comprises that the random access procedure is successfully completed; the third message is associated with a first identifier is used to determine that the random access procedure is successfully completed; the second information being used to indicate maintenance of the subset of the multiple pieces of configuration sub-information; a condition in the first condition set comprises the second information being received; each piece of configuration sub-information among the multiple pieces of configuration sub-information comprises one execution condition and one configuration set; and the first information indicates that the subset of the multiple pieces of configuration sub-information is maintained.

In one embodiment, the first node U01 comprises a UE.

In one embodiment, the second node N02 comprises a base station.

In one embodiment, the third node N03 comprises a base station.

In one embodiment, the second node N02 and the third node N03 are a same base station.

In one embodiment, the second node N02 and the third node N03 are two different base stations.

In one embodiment, the second node N02 comprises a maintenance base station for the first serving cell.

In one embodiment, the third node N03 comprises a maintenance base station for the first cell.

In one embodiment, the third node N03 comprises a maintenance base station for the second cell.

In one embodiment, the second message is transmitted via an air interface.

In one embodiment, the second message is transmitted via an antenna port.

In one embodiment, the second message comprises an Uplink (UL) signal.

In one embodiment, the second message comprises a Sidelink (SL) signal.

In one embodiment, the second message is transmitted on a Physical Random Access Channel (PRACH).

In one embodiment, the second message is transmitted on a Physical Uplink Shared Channel (PUSCH).

In one embodiment, the second message is transmitted on a Common Control Channel (CCCH).

In one embodiment, the second message comprises all or part of a Physical Layer Signal.

In one embodiment, the second message comprises all or part of an RRC message.

In one embodiment, the second message comprises an Uplink (UL) signal.

In one embodiment, the second message comprises at least one of a PRACH or a PUSCH.

In one embodiment, the phrase that the second message is used for a random access procedure comprises: the second message is a message in the random access procedure.

In one embodiment, the phrase that the second message is used for a random access procedure comprises: the second message comprises a Message 1 (Msg1), or a Message 3 (Msg3) or a Message A (MsgA).

In one embodiment, the second message comprises an Msg1.

In one subembodiment, the Msg1 comprises a Random Access Preamble.

In one subembodiment, the Msg1 comprises a first characteristic sequence.

In one subsidiary embodiment of the above subembodiment, the first characteristic sequence comprises one or more of a pseudo-random sequence, a Zadoff-Chu sequence or a low-Peak-to-Average Power Ratio (low-PAPR) sequence.

In one subsidiary embodiment of the above subembodiment, the first characteristic sequence comprises Cyclic Prefix (CP).

In one subsidiary embodiment of the above subembodiment, the first characteristic sequence comprises a positive integer.

In one subsidiary embodiment of the above subembodiment, the first characteristic sequence comprises a bit string.

In one embodiment, the second message comprises an Msg3.

In one subembodiment, the Msg3 comprises a CCCH message.

In one subembodiment, the Msg3 comprises a MAC Control Element (CE).

In one subembodiment, the Msg3 comprises a Buffer Status Report (BSR).

In one subembodiment, the Msg3 comprises Padding bits.

In one embodiment, the second message comprises a Message A (MsgA), the MsgA comprising at least the Msg1.

In one embodiment, the second message comprises a Message A (MsgA), the MsgA comprising at least the Msg1 and the Msg3.

In one subembodiment, the MsgA comprises a Random Access Preamble.

In one subembodiment, the MsgA comprises a CCCH message.

In one subembodiment, the MsgA comprises a MAC CE.

In one embodiment, the second message comprises the Msg1 and the Msg3, the Msg1 and the Msg3 being transmitted simultaneously.

In one embodiment, the second message comprises the Msg1 and the Msg3, the Msg1 and the Msg3 not being transmitted simultaneously.

In one embodiment, the third message is transmitted via an air interface.

In one embodiment, the third message is transmitted via an antenna port.

In one embodiment, the third message comprises a Downlink (DL) signal.

In one embodiment, the third message comprises a Sidelink (SL) signal.

In one embodiment, the third message is transmitted on a PDCCH.

In one embodiment, the third message comprises all or part of a Physical Layer Signal.

In one embodiment, the third message comprises all or part of a MAC layer signaling.

In one embodiment, the third message comprises all or part of an RRC message.

In one embodiment, the third message comprises a physical-layer signaling.

In one embodiment, the third message comprises a Physical Downlink Control Channel (PDCCH).

In one embodiment, the third message comprises one or more fields in an RRC message.

In one embodiment, the third message comprises all or part of (a) MAC layer signaling(s).

In one embodiment, the third message comprises Downlink Control Information (DCI).

In one embodiment, the third message comprises a Message 2 (Msg2).

In one subembodiment, the Msg2 comprises a Random Access Response (RAR).

In one subembodiment, the Msg2 comprises a MAC subheader.

In one subembodiment, the Msg2 comprises a MAC sub-Protocol-Data-Unit (sub-PDU).

In one subembodiment, the Msg2 comprises a Timing Advance (TA).

In one subembodiment, the Msg2 comprises a successRAR.

In one subembodiment, the Msg2 comprises a UL Grant.

In one subembodiment, the Msg2 comprises a Temporary C-RNTI (TC-RNTI).

In one subembodiment, the Msg2 comprises a C-RNTI.

In one embodiment, the third message comprises a Message 4 (Msg4).

In one subembodiment, the Msg4 comprises a UE Contention Resolution Identity.

In one subembodiment, the Msg4 comprises a CCCH message.

In one embodiment, the third message comprises a UL Grant.

In one embodiment, the third message comprises a PDCCH.

In one embodiment, the third message comprises DCI.

In one embodiment, the third message comprises a Message B (MsgB), the MsgB comprising at least the Msg2.

In one embodiment, the third message comprises a Message B (MsgB), the MsgB comprising at least the Msg4.

In one embodiment, the third message comprises a Message B (MsgB), the MsgB comprising at least the Msg2 and the Msg4.

In one embodiment, the third message is identified by a Radio Network Temporary Identifier (C-RNTI).

In one embodiment, Cyclic Redundancy Check (CRC) of the third message is scrambled by a C-RNTI or a MCS (i.e., abbreviation for Modulation and Coding Scheme)—C-RNTI.

In one embodiment, CRC of the third message is scrambled by at least one of a Temporary C-RNTI, or a C-RNTI, or a MsgB-RNTI or a Random Access-RNTI (RA-RNTI).

In one embodiment, the third message comprises the Msg2 and the Msg4, the Msg2 and the Msg4 being transmitted simultaneously.

In one embodiment, the third message comprises the Msg2 and the Msg4, the Msg2 and the Msg4 not being transmitted simultaneously.

In one embodiment, the phrase that a condition in the first condition set comprises that the random access procedure is successfully completed comprises: a condition for fulfilling the first condition set comprises that the random access procedure is successfully completed.

In one embodiment, the phrase that a condition in the first condition set comprises that the random access procedure is successfully completed comprises: a condition for fulfilling the first condition set comprises that the random access procedure is successfully completed.

In one embodiment, a notice from lower layers is received on an RRC layer, the notice being used to determine that the random access procedure is successfully completed.

In one embodiment, the phrase that the random access procedure is successfully completed comprises: a random access procedure for the first cell is successfully completed.

In one embodiment, the phrase that the random access procedure is completed in successfully completed: uplink synchronization with the first cell is successfully acquired.

In one embodiment, the phrase that the random access procedure is successfully completed: the random access procedure is deemed as being completed successfully.

In one embodiment, the phrase that the third message being associated with a first identifier is used to determine that the random access procedure is successfully completed comprises: upon reception of the third message, which is associated with the first identifier, it is determined that the random access procedure is successfully completed.

In one embodiment, the phrase that the third message being associated with a first identifier is used to determine that the random access procedure is successfully completed comprises: the successful completion of the random access procedure is related to the third message's being associated with a first identifier.

In one embodiment, the first identifier comprises a C-RNTI.

In one embodiment, the first identifier comprises a RAPID.

In one embodiment, the first identifier comprises a PREAMBLE_INDEX.

In one embodiment, the first identifier comprises a UE Contention Resolution Identity.

In one embodiment, the identifier comprises an identifier assigned to Preamble.

In one embodiment, the phrase that as a response to the action of maintaining a subset of the multiple pieces of configuration sub-information comprises: when determining that the subset of the multiple pieces of configuration sub-information is maintained.

In one embodiment, the phrase that as a response to the action of maintaining a subset of the multiple pieces of configuration sub-information comprises: before the first condition set is fulfilled.

In one embodiment, the phrase that as a response to the action of maintaining a subset of the multiple pieces of configuration sub-information comprises: when the first condition set is fulfilled.

In one embodiment, the phrase that as a response to the action of maintaining a subset of the multiple pieces of configuration sub-information comprises: after the first condition set is fulfilled.

In one embodiment, the first information is transmitted via an air interface.

In one embodiment, the first information is transmitted via an antenna port.

In one embodiment, the first information comprises an Uplink (UL) signal.

In one embodiment, the first information comprises a Sidelink (SL) signal.

In one embodiment, the first information comprises an RRC message, or a field in an RRC message.

In one subembodiment, the RRC message comprises either a RRCReconfigurationComplete message or RRCConnectionReconfigurationComplete.

In one subembodiment, the RRC message comprises a UEAssistanceInformation message.

In one subembodiment, the RRC message comprises a UECapabilityInformation message.

In one embodiment, the phrase that the first information indicates that the subset of the multiple pieces of configuration sub-information is maintained comprises: the first information explicitly indicates that the subset of the multiple pieces of configuration sub-information is maintained.

In one embodiment, the phrase that the first information indicates that the subset of the multiple pieces of configuration sub-information is maintained comprises: the first information implicitly indicates that the subset of the multiple pieces of configuration sub-information is maintained.

In one embodiment, the first information comprises one bit, the bit being used to indicate that the subset of the multiple pieces of configuration sub-information is maintained.

In one embodiment, the first information comprises one bitmap, the bitmap being used to indicate that the subset of the multiple pieces of configuration sub-information is maintained.

In one embodiment, the first information comprises a CondReconfigId corresponding to each piece of configuration sub-information in the subset of the multiple pieces of configuration sub-information, the CondReconfigId being used to indicate that the subset of the multiple pieces of configuration sub-information is maintained.

In one embodiment, the first information comprises a cell identifier corresponding to each piece of configuration sub-information in the subset of the multiple pieces of configuration sub-information, the cell identifier being used to indicate that the subset of the multiple pieces of configuration sub-information is maintained.

In one embodiment, the second information is transmitted via an air interface.

In one embodiment, the second information is transmitted via an antenna port.

In one embodiment, the second information comprises a Downlink (DL) signal.

In one embodiment, the second information comprises a Sidelink (SL) signal.

In one embodiment, the second information comprises an RRC message, or a field in an RRC message.

In one subembodiment, the RRC message comprises a RRCReconfiguration message, or a RRCConnectionReconfiguration message, or a ULInformationTransferMRDC message.

In one subembodiment, a field in the RRC message comprises a field in either CondReconfigToAddMod or CondReconfigurationAddMod.

In one embodiment, the phrase of the second information being used to indicate maintenance of the subset of the multiple pieces of configuration sub-information comprises: the second information explicitly indicates maintenance of the subset of the multiple pieces of configuration sub-information.

In one embodiment, the phrase of the second information being used to indicate maintenance of the subset of the multiple pieces of configuration sub-information comprises: the second information implicitly indicates maintenance of the subset of the multiple pieces of configuration sub-information.

In one embodiment, the second information comprises one bitmap, and each bit in the bitmap is associated with a piece of configuration sub-information; a bit in the bitmap being set to 1 is used to indicate maintenance of a piece of configuration sub-information corresponding to the bit; a bit in the bitmap being set to 0 is used to indicate release of a piece of configuration sub-information corresponding to the bit.

In one embodiment, the second information comprises one bit, the bit being used to indicate maintenance of the subset of the multiple pieces of configuration sub-information; the bit being set to 0 is used to indicate release of the subset of the multiple pieces of configuration sub-information, while the bit being set to 1 is used to indicate maintenance of the subset of the multiple pieces of configuration sub-information.

In one embodiment, the second information being set to release is used to indicate release of the subset of the multiple pieces of configuration sub-information; the second information being set to one of maintain, or keep, or reserve or retain, or hold is used to indicate maintenance of the multiple pieces of configuration sub-information.

In one embodiment, the first node U01 receives multiple pieces of configuration sub-information, of which each piece of configuration sub-information comprises one execution condition and one configuration set; and receives second information, the second information being used to indicate maintenance of the second configuration sub-information; in instances when the execution condition in first configuration sub-information is fulfilled, applies the configuration set in the first configuration sub-information, and transmitting a first message; after transmitting the first radio signal, maintains a subset of the multiple pieces of configuration sub-information, the subset comprising at least one piece of second configuration sub-information different from the first configuration sub-information.

In one embodiment, the phrase of a condition in the first condition set comprises the second information being received comprises: reception of the second information is a condition comprised in the first condition set.

In one embodiment, the phrase of a condition in the first condition set comprises the second information being received comprises: upon reception of the second information, the first condition set is fulfilled.

In one embodiment, the dotted-line box F1 is optional.
In one embodiment, the dotted-line box F1 exists.
In one embodiment, the dotted-line box F1 does not exist.
In one embodiment, the dotted-line box F2 is optional.
In one embodiment, the dotted-line box F2 exists.
In one embodiment, the dotted-line box F2 does not exist.
In one embodiment, the dotted-line box F3 is optional.
In one embodiment, the dotted-line box F3 exists.
In one embodiment, the dotted-line box F3 does not exist.

Embodiment 6

Figure 6:
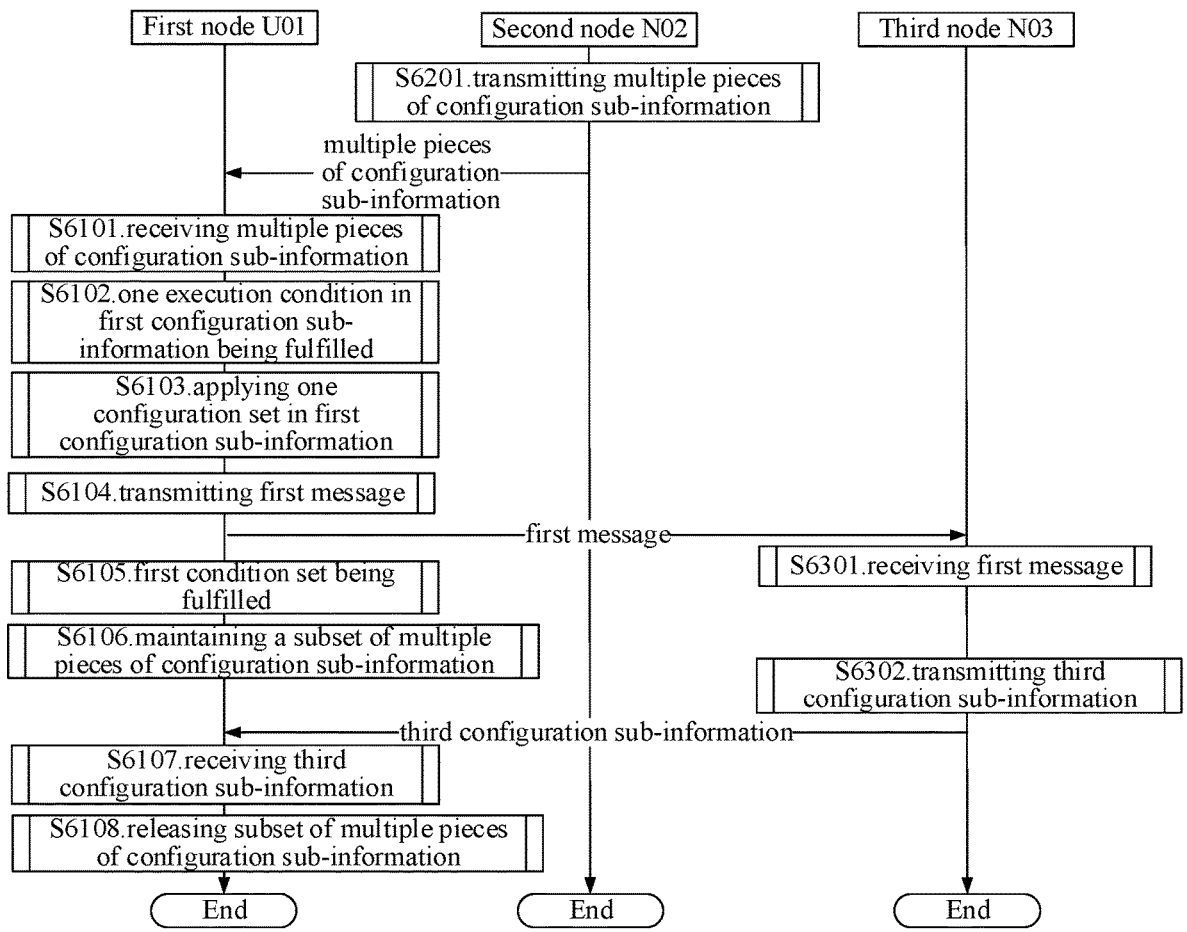
FIG. 6 illustrates a flowchart of radio signal transmission according to another embodiment of the present disclosure.

Embodiment 6 illustrates a flowchart of signal transmission according to another embodiment of the present disclosure, as shown in FIG. 6. It should be particularly noted that the sequence illustrated herein does not set any limit to the signal transmission order or implementation order in the present disclosure.

The first node U01 receives multiple pieces of configuration sub-information in step S6101; in step S6102, the execution condition in first configuration sub-information is fulfilled; in step S6103, in instances when the execution condition in first configuration sub-information is fulfilled, applies the configuration set in the first configuration sub-information; in step S6104, in instances when the execution condition in first configuration sub-information is fulfilled, transmits a first message; and in step S6105, a first condition set being fulfilled; in step S6106, in instances when a first condition set is fulfilled after transmitting the first message, maintains a subset of the multiple pieces of configuration sub-information; in step S6107, receives third configuration sub-information; and in step S6108, as a response to the action of receiving the third configuration sub-information, releases the subset of the multiple pieces of configuration sub-information.

The second node N02 transmits the multiple pieces of configuration sub-information in step S6201.

The third node N03 receives the first message in step S6301; and transmits the third configuration sub-information in step S6302.

In Embodiment 6, each piece of configuration sub-information among the multiple pieces of configuration sub-information comprises one execution condition and one configuration set; and the subset of the multiple pieces of configuration sub-information at least comprises the second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message; the third configuration sub-information comprises one execution condition and one configuration set, and the third configuration sub-information is different from any of the multiple pieces of configuration sub-information, the third configuration sub-information being associated with a third cell.

In one embodiment, the third node N03 comprises a maintenance base station for the third cell.

In one embodiment, the third configuration sub-information is transmitted via an air interface.

In one embodiment, the third configuration sub-information is transmitted via an antenna port.

In one embodiment, the third configuration sub-information comprises a Downlink (DL) signal.

In one embodiment, the third configuration sub-information comprises a Sidelink (SL) signal.

In one embodiment, the third configuration sub-information comprises an RRC message.

In one embodiment, the third configuration sub-information comprises one or more IEs in an RRC message.

In one embodiment, the third configuration sub-information comprises one or more fields in an RRC message.

In one embodiment, the third configuration sub-information comprises a RRCReconfiguration message or a RRCConnectionReconfiguration message.

In one embodiment, the third configuration sub-information comprises a DLInformationTransferMRDC message.

In one embodiment, the third configuration sub-information is an IE in an RRC message, the IE's name including ConditionalReconfiguration.

In one embodiment, the third configuration sub-information is an IE in an RRC message, the IE's name including condReconfigToAddModList or CondReconfigurationToAddModList.

In one embodiment, the third configuration sub-information is an IE in an RRC message, the IE's name including attemptCondReconfig or attemptCondReconf.

In one embodiment, the third configuration sub-information is a field in an RRC message, the field's name including CondReconfigToAddMod or CondReconfigurationAddMod.

In one embodiment, the third configuration sub-information is a field in an RRC message, the field's name including CondReconfigId or CondReconfigurationId.

In one embodiment, the third configuration sub-information is a field in an RRC message, the field's name including condExecutionCond or triggerCondition.

In one embodiment, the third configuration sub-information is a field in an RRC message, the field's name including condRRCReconfig or condReconfigurationToApply.

In one embodiment, the phrase that as a response to the action of receiving the third configuration sub-information comprises: upon reception of third configuration sub-information.

In one embodiment, the phrase that as a response to the action of receiving the third configuration sub-information comprises: after receiving third configuration sub-information.

In one embodiment, the phrase that as a response to the action of receiving the third configuration sub-information comprises: as one of subsequent actions following reception of third configuration sub-information.

In one embodiment, the behavior of releasing the subset of the multiple pieces of configuration sub-information comprises: removing the subset of the multiple pieces of configuration sub-information from VarConditionalReconfig or VarConditionalReconfiguration.

In one embodiment, the phrase that the third configuration sub-information comprises one execution condition and one configuration set comprises: the execution condition and the configuration set are respectively fields comprised in the third configuration sub-information.

In one embodiment, the phrase that the third configuration sub-information comprises one execution condition and one configuration set comprises: the third configuration sub-information comprises a field in an RRC message, the field being used to indicate the execution condition; the third configuration sub-information comprises another field in an RRC message, the field being used to indicate the configuration set.

In one embodiment, the phrase that the third configuration sub-information is different from any of the multiple pieces of configuration sub-information comprises: the third configuration sub-information and any of the multiple pieces of configuration sub-information are associated with two different cells.

In one embodiment, the phrase that the third configuration sub-information is different from any of the multiple pieces of configuration sub-information comprises: execution conditions comprised in the third configuration sub-information and any of the multiple pieces of configuration sub-information are different.

In one embodiment, the phrase that the third configuration sub-information is different from any of the multiple pieces of configuration sub-information comprises: configuration sets comprised in the third configuration sub-information and any of the multiple pieces of configuration sub-information are different.

In one embodiment, the phrase that the third configuration sub-information is different from any of the multiple pieces of configuration sub-information comprises: execution conditions and configuration sets comprised in the third configuration sub-information and any of the multiple pieces of configuration sub-information are respectively different.

In one embodiment, the phrase that the third configuration sub-information is associated with a third cell comprises: the third configuration sub-information is for the third cell.

In one embodiment, the phrase that the third configuration sub-information is associated with a third cell comprises: the third configuration sub-information is a configuration for the third cell.

In one embodiment, the phrase that the third configuration sub-information is associated with a third cell comprises: the third configuration sub-information carries a cell identifier of the third cell.

Embodiment 7

Figure 7:
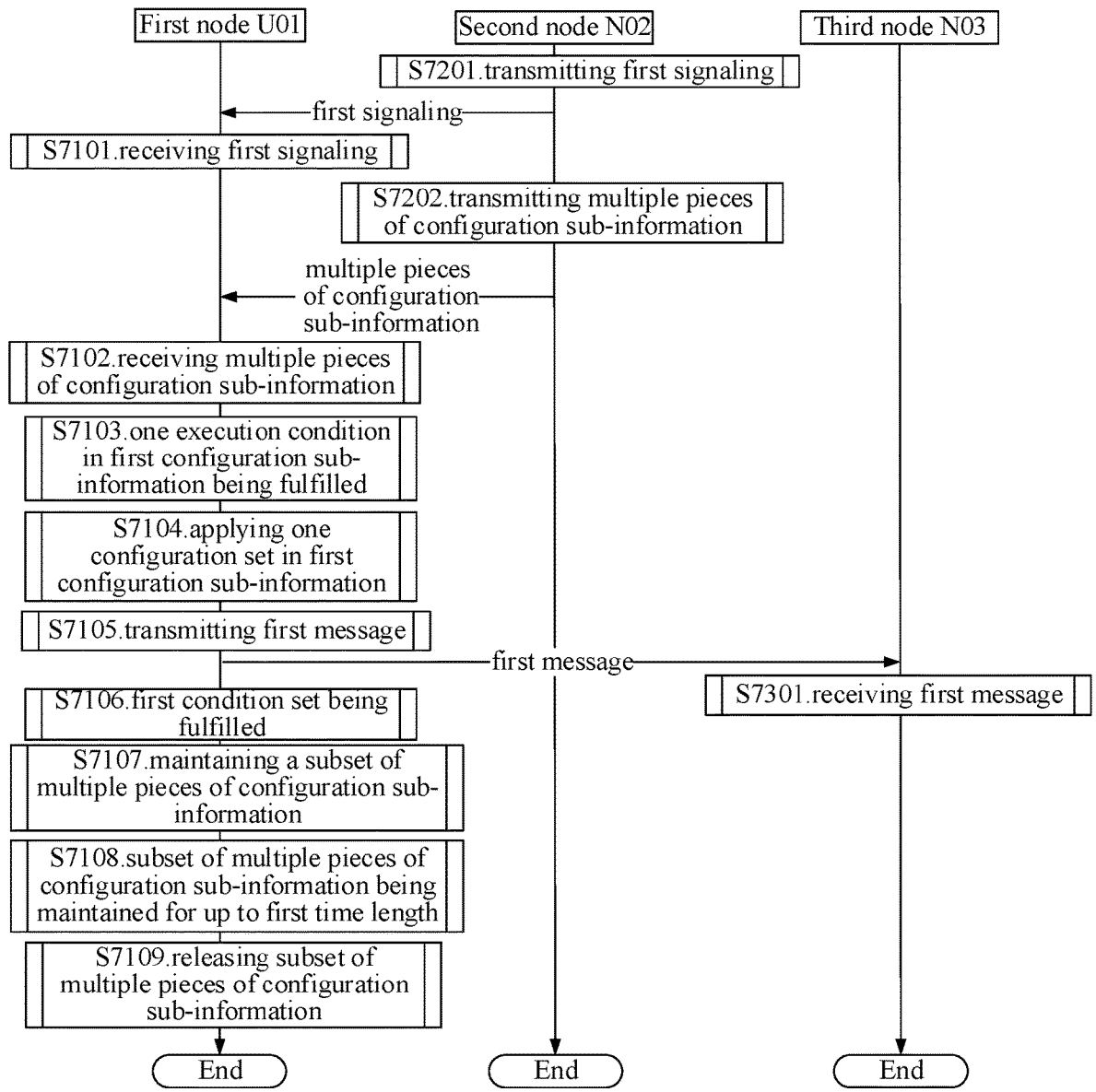
FIG. 7 illustrates a flowchart of radio signal transmission according to another embodiment of the present disclosure.

Embodiment 7 illustrates a flowchart of signal transmission according to another embodiment of the present disclosure, as shown in FIG. 7. It should be particularly noted that the sequence illustrated herein does not set any limit to the signal transmission order or implementation order in the present disclosure.

The first node U01 receives a first signaling in step S7101; receives multiple pieces of configuration sub-information in step S7102; in step S7103, the execution condition in first configuration sub-information being fulfilled; in step S7104, in instances when the execution condition in first configuration sub-information is fulfilled, applies the configuration set in the first configuration sub-information; in step S7105, in instances when the execution condition in first configuration sub-information is fulfilled, transmits a first message; and in step S7106, a first condition set being fulfilled; in step S7107, in instances when a first condition set is fulfilled after transmitting the first message, maintains a subset of the multiple pieces of configuration sub-information; in step S7108, the subset of the multiple pieces of configuration sub-information is maintained for up to the first time length; in step S7109, when the subset of the multiple pieces of configuration sub-information is maintained for up to the first time length, releases the subset of the multiple pieces of configuration sub-information.

The second node N02 transmits the first signaling in step S7201; and transmits the multiple pieces of configuration sub-information in step S7202.

The third node N03 receives the first message in step S7301.

In Embodiment 7, the first signaling indicating a first time length; the first time length comprises a positive integer number of slots; each piece of configuration sub-information among the multiple pieces of configuration sub-information comprises one execution condition and one configuration set; and the subset of the multiple pieces of configuration sub-information at least comprises the second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the first signaling is transmitted via an air interface.

In one embodiment, the first signaling is transmitted via an antenna port.

In one embodiment, the first signaling comprises a Downlink (DL) signal.

In one embodiment, the first signaling comprises a Sidelink (SL) signal.

In one embodiment, the first signaling comprises an RRC message.

In one embodiment, the first signaling comprises a RRCReconfiguration message or a RRCConnectionReconfiguration message.

In one embodiment, the first signaling comprises a SIB1 message, or a SystemInformation message, or a SystemInformationBlockType1 message.

In one embodiment, the first signaling comprises one field in an RRC message.

In one embodiment, the phrase that the first signaling indicates a first time length comprises: the first signaling comprises the first time length.

In one embodiment, the phrase that the first signaling indicates a first time length comprises: the first time length is a field in the first signaling.

In one embodiment, the phrase that the first signaling indicates a first time length comprises: the first time length is configured through the first signaling.

In one embodiment, the phrase that the first signaling indicates a first time length comprises: the first signaling is used to determine the first time length.

In one embodiment, the first time length is configurable.

In one embodiment, the first time length is pre-configured.

In one embodiment, the first time length is of a fixed size.

In one embodiment, the first time length is related to the cell parameter of the first cell or the cell parameter of the second cell.

In one embodiment, the phrase that the subset of the multiple pieces of configuration sub-information is maintained for up to the first time length comprises: a length of time for which the subset of the multiple pieces of configuration sub-information is maintained is equal to the first time length.

In one embodiment, the phrase that the subset of the multiple pieces of configuration sub-information is maintained for up to the first time length comprises: a length of time for which the subset of the multiple pieces of configuration sub-information is maintained is larger than the first time length.

In one embodiment, the action of releasing the subset of the multiple pieces of configuration sub-information comprises: releasing the subset of the multiple pieces of configuration sub-information stored in VarConditionalReconfig or VarConditionalReconfiguration.

In one embodiment, the action of releasing the subset of the multiple pieces of configuration sub-information comprises: releasing all entry/entries stored in VarConditionalReconfig or VarConditionalReconfiguration.

In one subembodiment, all entry/entries stored in VarConditionalReconfig or VarConditionalReconfiguration include entry/entries corresponding to the subset of the multiple pieces of configuration sub-information.

In one embodiment, the action of releasing the subset of the multiple pieces of configuration sub-information comprises: releasing information in CondReconfigToAddModList or CondReconfigurationToAddModList.

In one embodiment, the action of releasing the subset of the multiple pieces of configuration sub-information comprises: releasing all execution-condition related configurations in the multiple pieces of configuration sub-information.

In one subembodiment, the all execution-condition related configurations comprise all execution conditions stored in VarConditionalReconfig or VarConditionalReconfiguration, where the execution condition is associated with measId(s).

In one embodiment, the action of releasing multiple pieces of configuration sub-information comprises: releasing all configuration-set related configurations in the multiple pieces of configuration sub-information.

In one subembodiment, all the configuration-set related configurations comprise all RRC configurations stored in VarConditionalReconfig or VarConditionalReconfiguration, where the RRC configuration comprises either RRCReconfiguration or RRCConnectionReconfiguration.

In one embodiment, the positive integer number means being no less than 1.

In one embodiment, the phrase that the first time length comprises a positive integer number of slots comprises: the first time length is composed of a positive integer number of slots.

In one embodiment, the phrase that the first time length comprises a positive integer number of slots comprises: the first time length is equivalent to a positive integer number of slots.

In one embodiment, the slot comprises at least one of slot(s), or subframe(s), or Radio Frame(s), or multiple Orthogonal Frequency Division Multiplexing (OFDM) symbols, or multiple Single Carrier Frequency Division Multiple Access (SC-FDMA) symbols.

In one embodiment, the first time length is no greater than 10000 seconds.

In one embodiment, the first time length comprises a positive integer number of millisecond(s).

In one embodiment, a first timer is used to determine whether the length of time for which the subset of the multiple pieces of configuration sub-information is maintained has reached the first time length.

In one subembodiment, in response to the behavior of applying the configuration set in the first configuration sub-information and transmitting a first message, a first timer is started.

In one subembodiment, the subset of the multiple pieces of configuration sub-information is released upon expiration of the first timer.

In one subembodiment, the first timer running for a time length up to the first time length is used to determine that the first timer is expired.

In one subembodiment, the first timer comprises an RRC layer timer.

In one subembodiment, the first timer comprises a timer.

In one subembodiment, an expiration value for the first timer comprises the first time length.

Embodiment 8

Embodiment 8 illustrates a schematic diagram about whether a subset of multiple pieces of configuration sub-information is maintained according to one embodiment of the present disclosure, as shown in FIG. 8. In FIG. 8, each step represents a step, it should be particularly noted that the sequence order of each box herein does not imply a chronological order of steps marked respectively by these boxes.

In Embodiment 8, in step S801, receive multiple pieces of configuration sub-information, of which each piece of configuration sub-information comprises one execution condition and one configuration set; and in step S802, an execution condition in first configuration sub-information is fulfilled; in step S803, in instances when the execution condition in first configuration sub-information is fulfilled, apply the configuration set in the first configuration sub-information, and transmit a first message; in step S804, determine whether a first condition set is fulfilled, in instances when the first condition set is fulfilled, enter into step S805(*a*), or in instances when the first condition set is unfulfilled, enter into step S805(*b*); in step S805(*a*), in instances when a first condition set is fulfilled after transmitting the first message, maintain a subset of the multiple pieces of configuration sub-information, the subset of the multiple pieces of configuration sub-information at least comprising second configuration sub-information; in step S805(*b*), release the multiple pieces of configuration sub-information.

In Embodiment 8, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the action of releasing multiple pieces of configuration sub-information comprises: releasing all pieces of configuration sub-information among the multiple pieces of configuration sub-information.

In one embodiment, the action of releasing multiple pieces of configuration sub-information comprises: releasing the multiple pieces of configuration sub-information stored in VarConditionalReconfig or VarConditionalReconfiguration.

In one embodiment, the action of releasing multiple pieces of configuration sub-information comprises: releasing all entry/entries stored in VarConditionalReconfig or VarConditionalReconfiguration.

In one embodiment, the action of releasing multiple pieces of configuration sub-information comprises: releasing information in CondReconfigToAddModList.

In one embodiment, the action of releasing multiple pieces of configuration sub-information comprises: releasing all execution-condition related configurations in the multiple pieces of configuration sub-information.

In one subembodiment, the all execution-condition related configurations comprise all execution conditions stored in VarConditionalReconfig or VarConditionalReconfiguration, where the execution condition is associated with measId(s).

In one embodiment, the action of releasing multiple pieces of configuration sub-information comprises: releasing all configuration-set related configurations in the multiple pieces of configuration sub-information.

In one subembodiment, all the configuration-set related configurations comprise all RRC configurations stored in VarConditionalReconfig or VarConditionalReconfiguration, where the RRC configuration comprises RRCReconfiguration.

Embodiment 9

Embodiment 9 illustrates a schematic diagram of a first condition set relating to at least one of a cell parameter of a first cell or a cell parameter of a second cell according to one embodiment of the present disclosure, as shown in FIG. 9.

In Embodiment 9, the first condition set is related to at least one of a cell parameter of the first cell or a cell parameter of the second cell; the cell parameter comprises at least one of a cell type, a cell height, or a cell orbit or a cell delay, or a cell ephemeris.

In one embodiment, the phrase that the first condition set is related to at least one of a cell parameter of the first cell or a cell parameter of the second cell comprises: a condition comprised in the first condition set is related to at least one of a cell parameter of the first cell or a cell parameter of the second cell.

In one embodiment, the phrase that the first condition set is related to at least one of a cell parameter of the first cell or a cell parameter of the second cell comprises: a condition comprised in the first condition set is related to a cell parameter of the first cell.

In one embodiment, the phrase that the first condition set is related to at least one of a cell parameter of the first cell or a cell parameter of the second cell comprises: a condition comprised in the first condition set is related to a cell parameter of the second cell.

In one embodiment, the phrase that the first condition set is related to at least one of a cell parameter of the first cell or a cell parameter of the second cell comprises: a condition comprised in the first condition set is related to a cell parameter of the first cell and a cell parameter of the second cell.

In one embodiment, a condition for fulfilling the first condition set comprises that the cell parameter of the first cell is the same as the cell parameter of the second cell.

In one embodiment, a condition for fulfilling the first condition set comprises that the cell parameter of the first cell indicates that the first cell is an NTN cell and that the cell parameter of the second cell indicates that the second cell is an NTN cell.

In one embodiment, a condition for fulfilling the first condition set comprises that the cell parameter of the first cell is different from the cell parameter of the second cell.

In one embodiment, a condition for fulfilling the first condition set comprises that the cell parameter of the first cell indicates that the first cell is an NTN cell and that the cell parameter of the second cell indicates that the second cell is a TN cell.

In one embodiment, a condition for fulfilling the first condition set comprises that the cell parameter of the first cell indicates that the first cell is a TN cell and that the cell parameter of the second cell indicates that the second cell is an NTN cell.

In one embodiment, a condition for fulfilling the first condition set comprises that the cell parameter of the first cell indicates that the first cell is an NTN cell.

In one embodiment, a condition for fulfilling the first condition set comprises that the cell parameter of the second cell indicates that the second cell is an NTN cell.

In one embodiment, the cell parameter of the first cell is the same as the cell parameter of the second cell.

In one embodiment, the cell parameter of the first cell is different from the cell parameter of the second cell.

In one embodiment, the cell parameter is configured by an RRC message.

In one subembodiment, the RRC message comprises a RRCReconfiguration message or a RRCConnectionReconfiguration message.

In one subembodiment, the RRC message comprises a SIB1 message, or a SystemInformation message, or a SystemInformationBlockType1 message.

In one embodiment, the cell parameter is obtained from measurements by a UE.

In one embodiment, the cell parameter is determined by implementation of a UE.

In one embodiment, the cell parameter is used to indicate that a given cell is an NTN cell.

In one embodiment, the cell parameter is used to indicate that a given cell is a TN cell.

In one embodiment, the cell parameter comprises the type of a given cell.

In one embodiment, the cell parameter comprises the height of a given cell.

In one embodiment, the cell parameter comprises the orbit of a given cell.

In one embodiment, the cell parameter comprises the delay of a given cell.

In one embodiment, the cell parameter comprises the ephemeris of a given cell.

In one embodiment, the delay of the cell comprises: a Round Trip Time (RTT).

In one embodiment, the delay of the cell comprises: a Timing Advance (TA).

In one embodiment, the delay of the cell comprises: a Common Delay.

In one embodiment, the delay of the cell comprises: a Specific Delay.

In one embodiment, the delay of the cell comprises: a Common TA between the first node and a maintenance base station for a given cell.

In one embodiment, the delay of the cell comprises: a UE-specific delay, the UE-specific delay being determined by a UE.

In one embodiment, the height of the cell comprises: a height of a maintenance base station for a given cell.

In one embodiment, the height of the cell comprises: an elevation of a maintenance base station for a given cell.

In one embodiment, the height of the cell comprises: a distance between a maintenance base station for a given cell and the horizon.

In one embodiment, the height of the cell comprises: a vertical distance between a maintenance base station for a given cell and the horizon.

In one embodiment, the type of the cell comprises: a given cell is an NTN cell.

In one embodiment, the type of the cell comprises: a given cell is a TN cell.

In one embodiment, the orbit of the cell comprises: an orbit of a maintenance base station for a given cell.

In one embodiment, the orbit of the cell comprises: a running orbit of a maintenance base station for a given cell.

In one embodiment, the orbit of the cell comprises: Non-Geostationary Satellite Orbit (NGSO).

In one embodiment, the orbit of the cell comprises: Geostationary Earth Orbit (GEO).

In one embodiment, the orbit of the cell comprises: Highly Elliptical Orbit (HEO).

In one embodiment, the orbit of the cell comprises: Low Earth Orbit (LEO).

In one embodiment, the orbit of the cell comprises: Medium Earth Orbit (MEO).

In one embodiment, the Ephemeris of the cell comprises: periodical statistics used for computing satellite positions.

In one embodiment, the Ephemeris of the cell is used to determine a satellite position at a given time.

In one embodiment, the Ephemeris of the cell comprises time information.

In one embodiment, the Ephemeris of the cell comprises information of satellite orbit corresponding to a given cell.

In one embodiment, the Ephemeris of the cell comprises information of satellite type corresponding to a given cell.

In one embodiment, the Ephemeris of the cell comprises information of satellite height corresponding to a given cell.

In one embodiment, the cell parameter of a given cell indicates that the given cell is an NTN cell or a TN cell.

In one subembodiment, the cell parameter of the given cell comprises the type of the given cell, which is explicitly indicated by an RRC message.

In one subsidiary embodiment of the above subembodiment, the RRC message comprises a Master Information Block (MIB) message.

In one subsidiary embodiment of the above subembodiment, the RRC message comprises a System Information Block (SIB) message.

In one subsidiary embodiment of the above subembodiment, the RRC message comprises a RRCReconfiguration message or a RRCConnectionReconfiguration message.

In one subsidiary embodiment of the above subembodiment, the RRC message comprises a field, the field indicating the type of the given cell.

In one inferior embodiment of the above subsidiary embodiment, the field indicates that the given cell is an NTN cell.

In one inferior embodiment of the above subsidiary embodiment, the field indicates that the given cell is a TN cell.

In one inferior embodiment of the above subsidiary embodiment, the field indicates a type of an NTN cell of the given cell.

In one subembodiment, the cell parameter of the given cell comprises the type of the given cell, which is implicitly indicated by an RRC message.

In one subsidiary embodiment of the above subembodiment, the RRC message comprises a field, the field indicating the orbit of the given cell.

In one subsidiary embodiment of the above subembodiment, the RRC message comprises a field, the field indicating the height of the given cell.

In one subsidiary embodiment of the above subembodiment, the RRC message comprises a field, the field indicating the delay of the given cell.

In one subsidiary embodiment of the above subembodiment, the RRC message comprises a field, the field indicating the ephemeris of the given cell.

In one embodiment, the given cell comprises the first cell.

In one embodiment, the given cell comprises the second cell.

In one embodiment, the given cell comprises the third cell.

Embodiment 10

FIG. 10 illustrates a structure block diagram of a processing device used in a first node according to one embodiment of the present disclosure; as shown in FIG. 10. In FIG. 10, a processing device 1000 in the first node is comprised of a first receiver 1001 and a first transmitter 1002.

The first receiver 1001 receives multiple pieces of configuration sub-information, of which each piece of configuration sub-information comprises one execution condition and one configuration set; and the first transmitter 1002, in instances when the execution condition in first configuration sub-information is fulfilled, applies the configuration set in the first configuration sub-information, and transmits a first message;

the first receiver 1001, in instances when a first condition set is fulfilled after transmitting the first message, maintains a subset of the multiple pieces of configuration sub-information, the subset of the multiple pieces of configuration sub-information at least comprising second configuration sub-information.

In Embodiment 10, the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the first transmitter 1002, in instances when the execution condition in first configuration sub-information is fulfilled, transmits a second message; and the first receiver 1001 receives a third message; herein, the second message is used for a random access procedure; a condition in the first condition set comprises that the random access procedure is successfully completed; the third message being associated with a first identifier is used to determine that the random access procedure is successfully completed.

In one embodiment, the first transmitter 1002, as a response to the action of maintaining a subset of the multiple pieces of configuration sub-information, transmits first information; the first information indicates that the subset of the multiple pieces of configuration sub-information is maintained.

In one embodiment, the first receiver 1001 receives second information, the second information being used to indicate maintenance of the subset of the multiple pieces of configuration sub-information; a condition in the first condition set comprises the second information being received.

In one embodiment, the first condition set is related to at least one of a cell parameter of the first cell or a cell parameter of the second cell; the cell parameter comprises at least one of a cell type, a cell height, or a cell orbit or a cell delay, or a cell ephemeris.

In one embodiment, the first receiver 1001 receives a first signaling, the first signaling indicating a first time length; when the subset of the multiple pieces of configuration sub-information is maintained for up to the first time length, releasing the subset of the multiple pieces of configuration sub-information; herein, the first time length comprises a positive integer number of slots.

In one embodiment, the first receiver 1001 receives third configuration sub-information; as a response to the action of receiving the third configuration sub-information, releasing the subset of the multiple pieces of configuration sub-information; herein, the third configuration sub-information comprises one execution condition and one configuration set, and the third configuration sub-information is different from any of the multiple pieces of configuration sub-information, the third configuration sub-information being associated with a third cell.

In one embodiment, the first receiver 1001 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1001 comprises the antenna 452, the receiver 454, the multi-antenna receiving processor 458 and the receiving processor 456 in FIG. 4 of the present disclosure.

In one embodiment, the first receiver 1001 comprises the antenna 452, the receiver 454 and the receiving processor 456 in FIG. 4 of the present disclosure.

In one embodiment, the first transmitter 1002 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1002 comprises the antenna 452, the transmitter 454, the multi-antenna transmitting processor 457 and the transmitting processor 468 in FIG. 4 of the present disclosure.

In one embodiment, the first transmitter 1002 comprises the antenna 452, the transmitter 454 and the transmitting processor 468 in FIG. 4 of the present disclosure.

Embodiment 11

Figure 11:
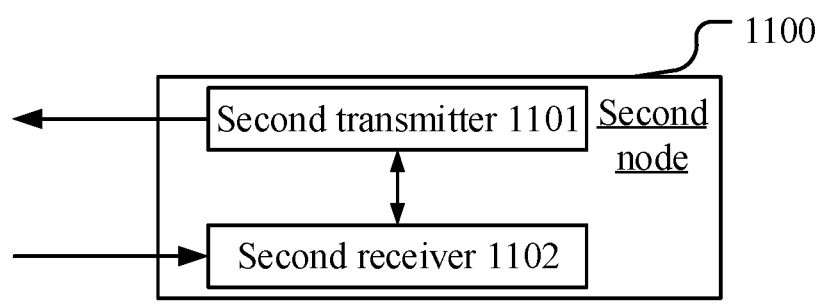
FIG. 11 illustrates a structure block diagram of a processing device used in a second node according to one embodiment of the present disclosure.

Embodiment 11 illustrates a structure block diagram of a processing device used in a second node according to one embodiment of the present disclosure; as shown in FIG. 11. In FIG. 11, a processing device 1100 in the second node is comprised of a second transmitter 1101 and a second receiver 1102.

The second transmitter 1101 transmits multiple pieces of configuration sub-information, of which each piece of configuration sub-information comprises one execution condition and one configuration set.

In Embodiment 11, when the execution condition in first configuration sub-information is fulfilled, the configuration set in the first configuration sub-information is applied and a first message is transmitted; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the configuration set in the first configuration sub-information is applied by (a) receiver(s) for the multiple pieces of configuration sub-information.

In one embodiment, the first message is transmitted by (a) receiver(s) for the multiple pieces of configuration sub-information, and the first message is received by a maintenance base station for the first cell.

In one embodiment, the subset of the multiple pieces of configuration sub-information is maintained by (a) receiver(s) for the multiple pieces of configuration sub-information.

In one embodiment, in instances when the execution condition in first configuration sub-information is fulfilled, a second message is transmitted; and a third message is received; the second message is used for a random access procedure; a condition in the first condition set comprises that the random access procedure is successfully completed; the third message being associated with a first identifier is used to determine that the random access procedure is successfully completed.

In one embodiment, the second message is transmitted by (a) receiver(s) for the multiple pieces of configuration sub-information, and the second message is received by a maintenance base station for the first cell.

In one embodiment, the third message is received by (a) receiver(s) for the multiple pieces of configuration sub-information, and the third message is transmitted by a maintenance base station for the first cell.

In one embodiment, as a response to the action of a subset of the multiple pieces of configuration sub-information being maintained, first information is transmitted; the first information indicates that the subset of the multiple pieces of configuration sub-information is maintained.

In one embodiment, the first information is transmitted by (a) receiver(s) for the multiple pieces of configuration sub-information, and the first information is received by a maintenance base station for the first cell.

In one embodiment, the second transmitter 1101 transmits second information, the second information being used to indicate maintenance of the subset of the multiple pieces of configuration sub-information; a condition in the first condition set comprises the second information being received.

In one embodiment, the first condition set is related to at least one of a cell parameter of the first cell or a cell parameter of the second cell; the cell parameter comprises at least one of a cell type, a cell height, or a cell orbit or a cell delay, or a cell ephemeris.

In one embodiment, the second transmitter 1101 transmits a first signaling, the first signaling indicating a first time length; when the subset of the multiple pieces of configuration sub-information is maintained for up to the first time length, releasing the subset of the multiple pieces of configuration sub-information; herein, the first time length comprises a positive integer number of slots.

In one embodiment, third configuration sub-information is received; as a response to the action of the third configuration sub-information being received, the subset of the multiple pieces of configuration sub-information is released; the third configuration sub-information comprises one execution condition and one configuration set, and the third configuration sub-information is different from any of the multiple pieces of configuration sub-information, the third configuration sub-information being associated with a third cell.

In one embodiment, the third configuration sub-information is received by (a) receiver(s) for the multiple pieces of configuration sub-information, and the third configuration sub-information is transmitted by a maintenance base station for the first cell.

In one embodiment, the second transmitter 1101 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1101 comprises the antenna 420, the transmitter 418, the multi-antenna transmitting processor 471 and the transmitting processor 416 in FIG. 4 of the present disclosure.

In one embodiment, the second transmitter 1101 comprises the antenna 420, the transmitter 418 and the transmitting processor 416 in FIG. 4 of the present disclosure.

In one embodiment, the second receiver 1102 comprises the antenna 420, the receiver 418, the multi-antenna receiving processor 472, the receiving processor 470, the controller/processor 475 and the memory 476 in FIG. 4 of the present disclosure.

In one embodiment, the second receiver 1102 comprises the antenna 420, the receiver 418, the multi-antenna receiving processor 472 and the receiving processor 470 in FIG. 4 of the present disclosure.

In one embodiment, the second receiver 1102 comprises the antenna 420, the receiver 418 and the receiving processor 470 in FIG. 4 of the present disclosure.

Embodiment 12

Figure 12:
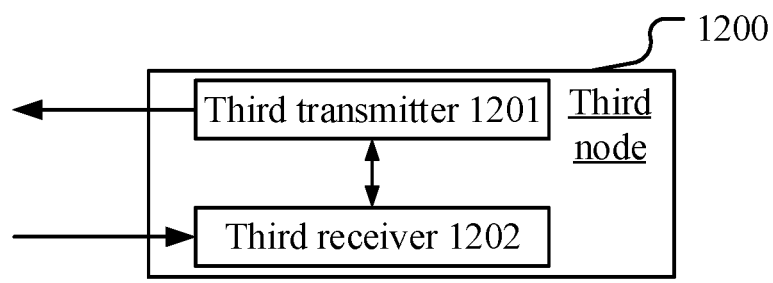
FIG. 12 illustrates a structure block diagram of a processing device used in a third node according to one embodiment of the present disclosure.

FIG. 12 illustrates a structure block diagram of a processing device used in a third node according to one embodiment of the present disclosure; as shown in FIG. 12. In FIG. 12, a processing device 1200 in the third node is comprised of a third transmitter 1201 and a third receiver 1202.

The third receiver 1202 receives a first message.

In Embodiment 12, multiple pieces of configuration sub-information are received, with each piece of configuration sub-information comprising one execution condition and one configuration set; when the execution condition in first configuration sub-information is fulfilled, the configuration set in the first configuration sub-information is applied; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message.

In one embodiment, the multiple pieces of configuration sub-information are received by a transmitter for the first message, and the first message is transmitted by a maintenance base station for the first serving cell in the present disclosure.

In one embodiment, the configuration set in the first configuration sub-information is applied by a transmitter for the first message.

In one embodiment, a subset of the multiple pieces of configuration sub-information is maintained by a transmitter for the first message.

In one embodiment, the third receiver 1202, in instances when the execution condition in first configuration sub-information is fulfilled, receives a second message; the third transmitter 1201 transmits a third message; herein, the second message is used for a random access procedure; a condition in the first condition set comprises that the random access procedure is successfully completed; the third message being associated with a first identifier is used to determine that the random access procedure is successfully completed.

In one embodiment, the third receiver 1202, as a response to the action of a subset of the multiple pieces of configuration sub-information being maintained, receives first information; the first information indicates that the subset of the multiple pieces of configuration sub-information is maintained.

In one embodiment, second information is received, the second information being used to indicate maintenance of the subset of the multiple pieces of configuration sub-information; a condition in the first condition set comprises the second information being received.

In one embodiment, the second information is received by a transmitter for the first message, and the second information is transmitted by a maintenance base station for the first serving cell in the present disclosure.

In one embodiment, the first condition set is related to at least one of a cell parameter of the first cell or a cell parameter of the second cell; the cell parameter comprises at least one of a cell type, a cell height, or a cell orbit or a cell delay, or a cell ephemeris.

In one embodiment, a first signaling is received, the first signaling indicating a first time length; when the subset of the multiple pieces of configuration sub-information is maintained for up to the first time length, releasing the subset of the multiple pieces of configuration sub-information; herein, the first time length comprises a positive integer number of slots.

In one embodiment, the first signaling is received by a transmitter for the first message, and the first signaling is transmitted by a maintenance base station for the first serving cell in the present disclosure.

In one embodiment, the third transmitter 1201 transmits third configuration sub-information; herein, upon reception of the third configuration sub-information, the subset of the multiple pieces of configuration sub-information is released; the third configuration sub-information comprises one execution condition and one configuration set, and the third configuration sub-information is different from any of the multiple pieces of configuration sub-information, the third configuration sub-information being associated with a third cell.

In one embodiment, the second transmitter 1201 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises the antenna 420, the transmitter 418, the multi-antenna transmitting processor 471 and the transmitting processor 416 in FIG. 4 of the present disclosure.

In one embodiment, the second transmitter 1201 comprises the antenna 420, the transmitter 418 and the transmitting processor 416 in FIG. 4 of the present disclosure.

In one embodiment, the second receiver 1202 comprises the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises the antenna 420, the receiver 418, the multi-antenna receiving processor 472 and the receiving processor 470 in FIG. 4 of the present disclosure.

In one embodiment, the second receiver 1202 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving multiple pieces of configuration sub-information, of which each piece of configuration sub-information comprises one execution condition and one configuration set; and
a first transmitter, in instances when the execution condition in first configuration sub-information is fulfilled, applying the configuration set in the first configuration sub-information, and transmitting a first message;
the first receiver, in instances when a first condition set is fulfilled after transmitting the first message, maintaining a subset of the multiple pieces of configuration sub-information, the subset of the multiple pieces of configuration sub-information at least comprising second configuration sub-information;

the first receiver, receiving third configuration sub-information; as a response to the action of receiving the third configuration sub-information, releasing the subset of the multiple pieces of configuration sub-information;

wherein the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message; the third configuration sub-information comprises one execution condition and one configuration set, and the third configuration sub-information is different from any of the multiple pieces of configuration sub-information, the third configuration sub-information being associated with a third cell.

2. The first node according to claim 1, comprising:
the first transmitter, in instances when the execution condition in first configuration sub-information is fulfilled, transmitting a second message; and
the first receiver, receiving a third message;
wherein the second message is used for a random access procedure; a condition in the first condition set comprises that the random access procedure is successfully completed; the third message being associated with a first identifier is used to determine that the random access procedure is successfully completed.

3. The first node according to claim 1, comprising:
the first transmitter, as a response to the action of maintaining a subset of the multiple pieces of configuration sub-information, transmitting first information; the first information indicates that the subset of the multiple pieces of configuration sub-information is maintained.

4. The first node according to claim 3, wherein the phrase that the first information indicates that the subset of the multiple pieces of configuration sub-information is maintained comprises: the first information explicitly indicates that the subset of the multiple pieces of configuration sub-information is maintained.

5. The first node according to claim 3, wherein the phrase that the first information indicates that the subset of the multiple pieces of configuration sub-information is maintained comprises: the first information implicitly indicates that the subset of the multiple pieces of configuration sub-information is maintained.

6. The first node according to claim 1, comprising:
the first receiver, receiving second information, the second information being used to indicate maintenance of the subset of the multiple pieces of configuration sub-information; a condition in the first condition set comprises the second information being received.

7. The first node according to claim 6, wherein the phrase that the second information is used to indicate maintenance of the subset of the multiple pieces of configuration sub-information comprises: the second information explicitly indicates maintenance of the subset of the multiple pieces of configuration sub-information.

8. The first node according to claim 6, wherein the phrase that the second information is used to indicate maintenance of the subset of the multiple pieces of configuration sub-information comprises: the second information implicitly indicates maintenance of the subset of the multiple pieces of configuration sub-information.

9. The first node according to claim 1, wherein the first condition set is related to at least one of a cell parameter of the first cell or a cell parameter of the second cell; the cell parameter comprises at least one of a cell type, or a cell altitude, or a cell orbit, or a cell delay or a cell ephemeris.

10. The first node according to claim 9, wherein a condition for fulfilling the first condition set comprises that the cell parameter of the second cell indicates that the second cell is an NTN cell.

11. The first node according to claim 9, wherein a condition for fulfilling the first condition set comprises that the cell parameter of the first cell indicates that the first cell is an NTN cell and that the cell parameter of the second cell indicates that the second cell is an NTN cell.

12. The first node according to claim 1, wherein the execution condition is related to a first threshold; and the first threshold is time-related.

13. The first node according to claim 1, wherein the execution condition is related to a first threshold; and the first threshold is position-related.

14. The first node according to claim 1, comprising:
the first receiver, receiving a first signaling, the first signaling indicating a first time length; when the subset of the multiple pieces of configuration sub-information is maintained for up to the first time length, releasing the subset of the multiple pieces of configuration sub-information;
wherein the first time length comprises a positive integer number of slots.

15. A second node for wireless communications, comprising:
a second transmitter, transmitting multiple pieces of configuration sub-information, of which each piece of configuration sub-information comprises one execution condition and one configuration set;
the second transmitter, transmitting third configuration sub-information;
wherein when the execution condition in first configuration sub-information is fulfilled, the configuration set in the first configuration sub-information is applied and a first message is transmitted; when a first condition set is fulfilled after transmission of the first message, a subset of the multiple pieces of configuration sub-information is maintained, the subset of the multiple pieces of configuration sub-information at least comprises second configuration sub-information;
the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message; as a response to the third configuration sub-information is received, the subset of the multiple pieces of configuration sub-information is released; the third configuration sub-information comprises one execution condition and one configuration set, and the third configuration sub-information is different from any of the multiple pieces of configuration sub-information, the third configuration sub-information being associated with a third cell.

16. The second node according to claim 15, comprising:
the second transmitter, transmitting second information, the second information being used to indicate maintenance of the subset of the multiple pieces of configuration sub-information; a condition in the first condition set comprises the second information being received.

17. A method in a first node for wireless communications, comprising:
receiving multiple pieces of configuration sub-information, of which each piece of configuration sub-information comprises one execution condition and one configuration set; and
in instances when the execution condition in first configuration sub-information is fulfilled, applying the configuration set in the first configuration sub-information, and transmitting a first message;
in instances when a first condition set is fulfilled after transmitting the first message, maintaining a subset of the multiple pieces of configuration sub-information, the subset of the multiple pieces of configuration sub-information at least comprising second configuration sub-information;
receiving third configuration sub-information; as a response to the action of receiving the third configuration sub-information, releasing the subset of the multiple pieces of configuration sub-information;
wherein the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message; the third configuration sub-information comprises one execution condition and one configuration set, and the third configuration sub-information is different from any of the multiple pieces of configuration sub-information, the third configuration sub-information being associated with a third cell.

18. A third node for wireless communications, comprising:
a third receiver, receiving a first message;
wherein multiple pieces of configuration sub-information are received, with each piece of configuration sub-information comprising one execution condition and one configuration set;
when the execution condition in first configuration sub-information is fulfilled, the configuration set in the first configuration sub-information is applied; when a first condition set is fulfilled after transmission of the first message, a subset of the multiple pieces of configuration sub-information is maintained, the subset of the multiple pieces of configuration sub-information at least comprises second configuration sub-information; the first configuration sub-information is any of the multiple pieces of configuration sub-information, and the second configuration sub-information is one of the multiple pieces of configuration sub-information other than the first configuration sub-information; the first configuration sub-information is associated with a first cell, while the second configuration sub-information is associated with a second cell; the first message is used to indicate completion of a radio link control reconfiguration; a condition in the first condition set comprises transmitting the first message; as a response to a third configuration sub-information is received, the subset of the multiple pieces of configuration sub-information is released; the third configuration sub-information comprises one execution condition and one configuration set, and the third configuration sub-information is different from any of the multiple pieces of configuration sub-information, the third configuration sub-information being associated with a third cell.

19. The third node according to claim 18, comprising:
the third receiver, as a response to the action of a subset of the multiple pieces of configuration sub-information being maintained, receiving first information; the first information indicates that the subset of the multiple pieces of configuration sub-information is maintained.

* * * * *